June 14, 1932.    R. F. MASSONNEAU    1,863,139
TIME OF DAY ANNOUNCING SYSTEM
Filed Jan. 12, 1931    18 Sheets-Sheet 3

INVENTOR
R.F. MASSONNEAU
BY P. C. Smith
ATTORNEY

INVENTOR
R. F. MASSONNEAU
BY P. C. Smith
ATTORNEY

June 14, 1932.  R. F. MASSONNEAU  1,863,139
TIME OF DAY ANNOUNCING SYSTEM
Filed Jan. 12, 1931   18 Sheets-Sheet 15

INVENTOR
R. F. MASSONNEAU
BY P. C. Smith
ATTORNEY

June 14, 1932.  R. F. MASSONNEAU  1,863,139
TIME OF DAY ANNOUNCING SYSTEM
Filed Jan. 12, 1931   18 Sheets-Sheet 17
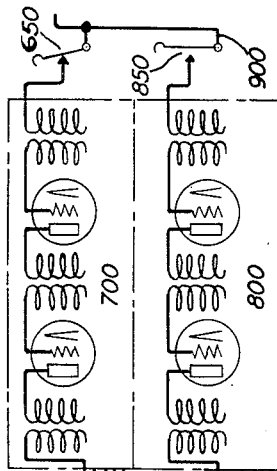
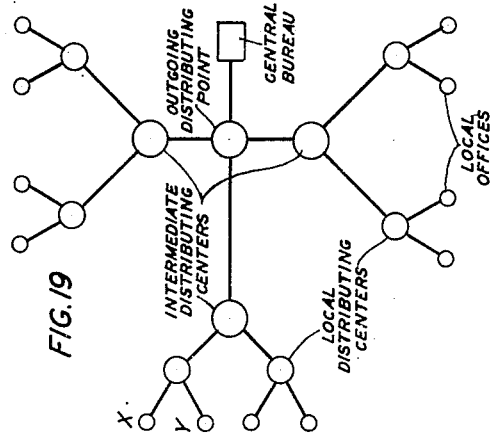
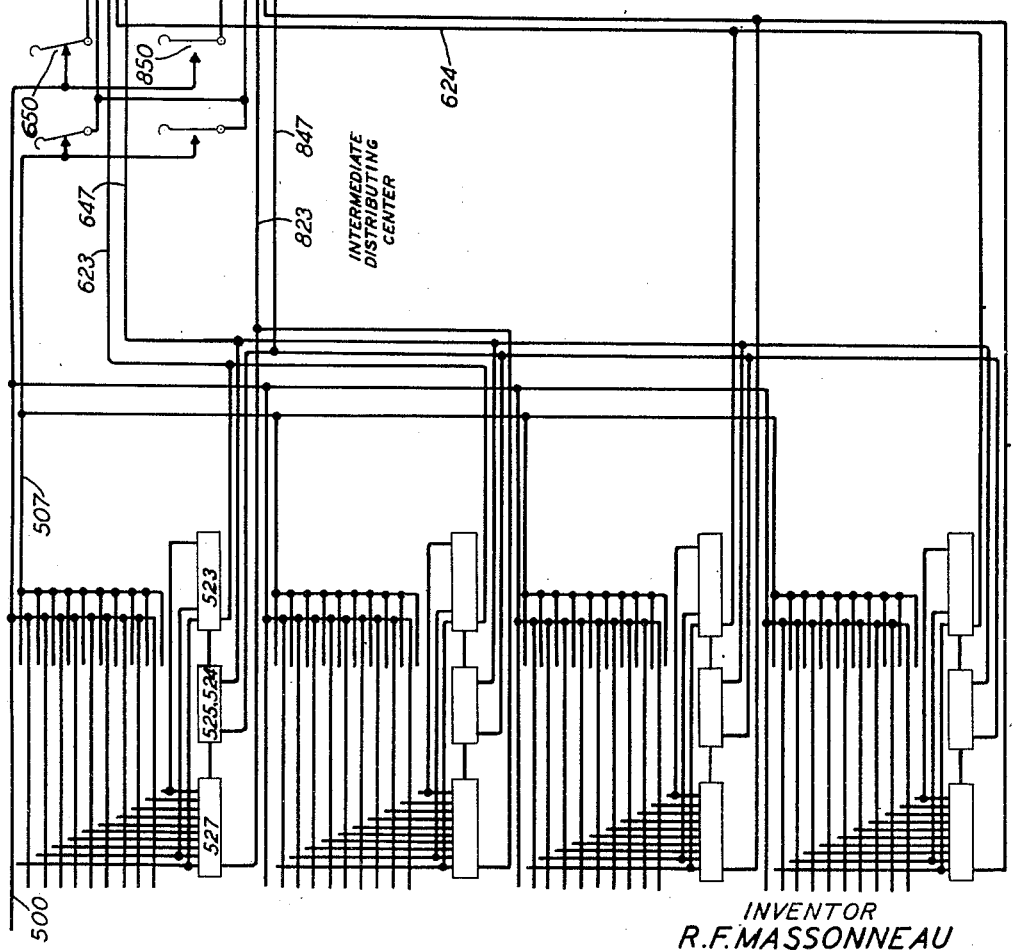
INVENTOR
R. F. MASSONNEAU
BY P. C. Smith
ATTORNEY

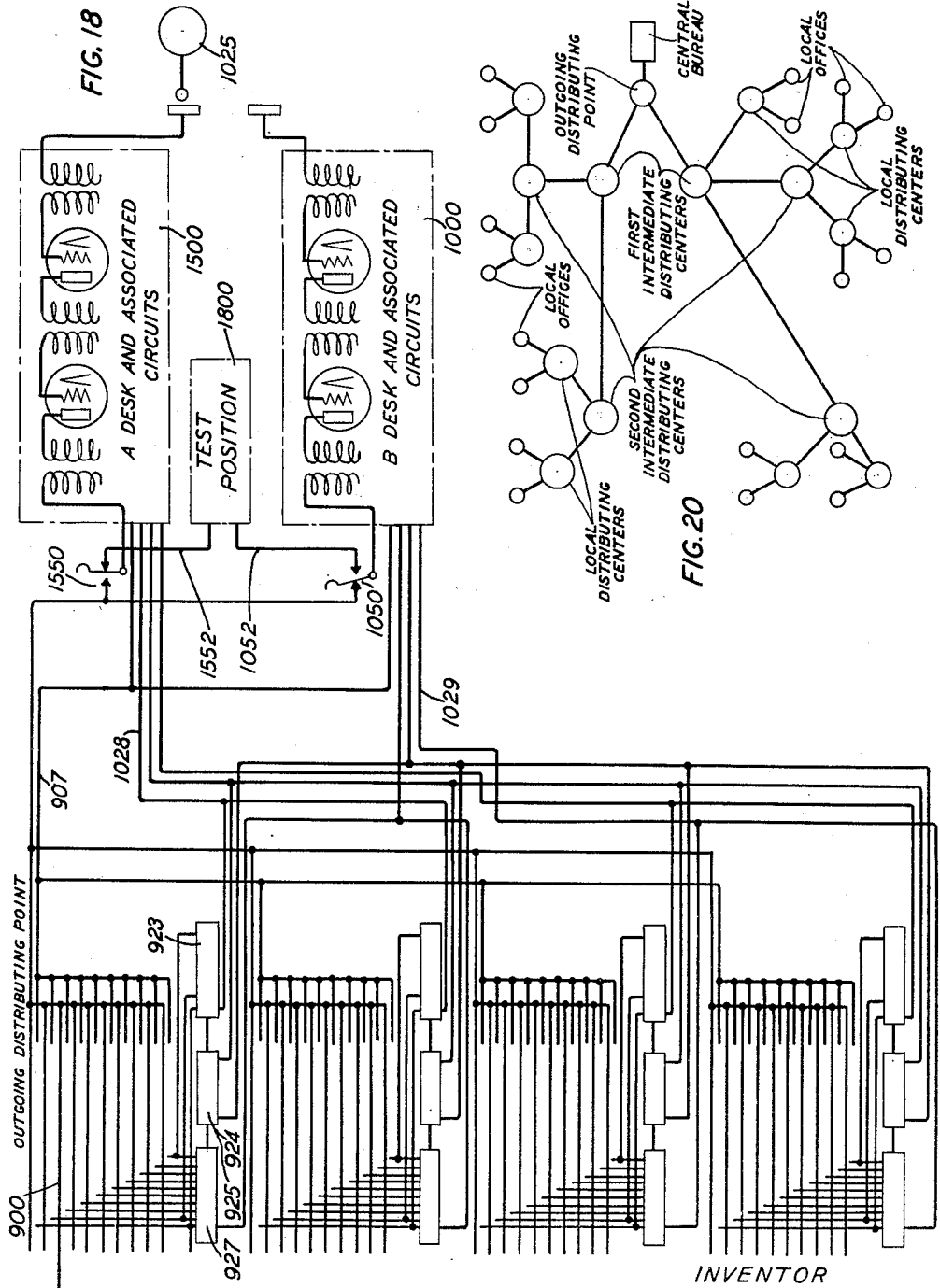

Patented June 14, 1932

1,863,139

UNITED STATES PATENT OFFICE

ROBERT F. MASSONNEAU, OF SCARSDALE, NEW YORK, ASSIGNOR TO BELL TELEPHONE LABORATORIES, INCORPORATED, OF NEW YORK, N. Y., A CORPORATION OF NEW YORK.

TIME OF DAY ANNOUNCING SYSTEM

Application filed January 12, 1931. Serial No. 508,209.

This invention relates to telephone exchange systems and more particularly to systems in which a subscriber by calling a particular line designation either by dialing as in machine switching systems, or by the aid of an operator as in manual systems, may obtain a connection with a central time announcing bureau from which at specified intervals announcements are made of the correct time of day. The object of the invention is to enable time of day announcements to be broadcast efficiently to as many subscribers in an exchange area, or a plurality of exchange areas, as request the time of day at any period thereof.

Heretofore it has been proposed to provide a time announcing mechanism for an office in which a plurality of subscribers' lines terminate which may be automatically selected by any calling subscriber of the office through the dialing of a line designation set aside for that purpose. Upon the seizure of the announcing mechanism from one or a plurality of subscribers' lines, the mechanism through phonographic means, for example, as is disclosed in Patent No. 1,227,523, granted to J. G. Blessing on March 22, 1917, or through photographic sound producing means, for example, as shown in Patent No. 1,618,242, granted to G. K. Thompson on February 22, 1927, transmits automatically to the subscriber's line the hour and minute of the time of day.

It has also been proposed to provide a special operator's position in the exchange area which may be called either automatically or manually in the same manner as a call would be made to another subscriber's line, the operator upon answering the call announcing to the calling subscriber the exact time of day.

Such systems when applied to a large exchange area require a plurality of time announcing bureaus to give adequate service and do not permit the centralization of the time service in a single operator's position for enabling one operator to announce the time on all calls incoming from an extended area. In accordance with the present invention, one embodiment of which has been disclosed by way of example, a single time announcing bureau employing but a single operator may be reached from offices or exchanges within a large area. For example, a time announcing bureau located in New York city might be employed for serving all of the exchange areas surrounding New York city within a radius of 300 miles, the distant exchange areas being connected to the time bureau over long distance trunk lines set aside for that purpose. Thus, when any subscriber in such an area desires the correct time it is only necessary for him to call a designated number, for example, Meridian 4000, whereupon if his line terminates in a manual exchange the operator will connect his line with a trunk extending directly, or through a distributing point to the time announcing bureau, or if his line terminates in a dial switching exchange, he will upon dialing the designated number become connected by automatic selector switches with a trunk extending to the time bureau either directly or through an intermediate distributing center.

By suitably fanning out the trunk line terminating in the time announcing bureau through intermediate and local distribution centers it is possible to enable the operator at the bureau to simultaneously announce the time to any number of subscribers in an extended area who may at any moment be connected to the bureau for the purpose of receiving the time announcement. In order that the voice currents from the time announcing operator's transmitter may be efficiently transmitted over such a network the present invention contemplates the employment of vacuum tube repeaters at the central time announcing bureau and at such intermediate and local distribution centers as may be necessary.

In general the system in accordance with the present invention functions as follows: It will be assumed, for example, that a subscriber whose line terminates in a dial switching office in Philadelphia desires the correct time and dials the designated number, Meridian 4000. In response to dialing, selector switches in the local office in the Philadelphia exchange system will establish a connection with a trunk terminating in a distribution center local to the Philadelphia area and multiplied with other trunks extending to other offices of the Philadelphia exchange and with other trunks extending to other exchanges in nearby communities to a toll trunk extending to an intermediate distributing center located, for example, in Trenton, N. J. This trunk at the Philadelphia distributing center would be provided with a one-way vacuum tube repeater for amplifying voice currents incoming thereto from the distributing center in Trenton. Also incoming to the distributing center in Trenton and multipled to the trunk extending to Philadelphia, other trunks would be provided extending to local distributing centers located, for example, at Atlantic City, N. J., Easton, Pa., etc. From this intermediate distributing center the multipled trunk would extend as a single trunk through a vacuum tube repeater to an outgoing distributing point in New York city and thence to the central bureau, also equipped with a repeater. Thus, the Philadelphia subscriber by dialing the designated number becomes connected over the trunk network directly with the central bureau. At the same time other subscribers located in the areas surrounding the local distribution centers in Philadelphia, Atlantic City, Easton, etc. may be in direct connection with the central time bureau in New York city. Also from the outgoing distributing point in New York city other trunk networks may extend northward through intermediate distributing centers for serving northern New York and eastward for serving New England. Indeed it is conceivable that, with a single central time bureau located at some central point along the eastern seaboard, the entire eastern time zone might be served.

It is of course obvious that the system according to the present invention might be used to give service locally to a large metropolitan area such as New York city. In that case the offices of the area would be grouped according to their location in the area into sections, each section being served by a local distributing center, the local distributing centers being connected by trunks extending either directly to an outgoing distributing point associated with a centrally located bureau, or to the bureau through intermediate distributing centers.

At the time bureau, whenever a call or any number of simultaneous calls are incoming over the trunk line terminating therein, a calling lamp signal is given to the operator to advise her of that fact and a circuit is established which is effective, in combination with a clock circuit associated with the operator's desk, during a 7½ second interval prior to the next time announcement period, to cut through the circuits extending from the calling lines that may at the time be connected to the central bureau preparatory to transmitting the announcement. The clock circuit is arranged to indicate the hours, minutes and quarter minutes and just prior to the next quarter minute period following the receipt of an incoming call, the operator is signaled to announce the time indicated by the clock. She then announces the time, for example, by saying, "When you hear the tone signal it will be exactly 5 and ¾ minutes after 5 o'clock". When this exact time is reached the clock circuit extinguishes the signal and transmits a tone signal to subscribers' lines which are connected to the central bureau. In this manner, the operator announces the time at one quarter minute intervals as long as the calling lamp at her position remains lighted.

In accordance with the present invention provision is made whereby the cutting through of a one-way voice transmission circuit from the central time bureau to a local office trunk line seized at the local office in which a calling line terminates is not effected at the local office trunk line until the clock circuit at the central bureau indicates a silent interval just preceding an announcement period. By thus synchronizing the cutting through of the transmission circuit with the clock the receipt of partial time announcements by calling subscribers is obviated.

Further provision is made whereby the repeaters used throughout the transmission network are arranged in duplicate so that if any repeater becomes defective it may be removed from service and service continued over the alternate repeater. Provision is also made in the local trunk circuit outgoing from any office and multipled at a local distributing center to a trunk extending toward the central time bureau for preventing cross talk from one trunk circuit to another if one calling subscriber attempts to talk while the time announcements are being transmitted from the central bureau.

Other features disclosed and described herein have been made the basis of other copending applications filed concurrently herewith. These applications are the application of H. G. W. Brown, Serial No. 508,207, the application of W. B. Prince, Serial No. 508,208 and the joint application of C. W. Keckler and A. E. Hague, Serial No. 508,211.

A clearer conception of the scope and purpose of the invention will be obtained from a consideration of the following description taken in connection with the attached drawings, in which:

Fig. 1 shows schematically a calling line, line finder and first and second selectors of a step-by-step type office of a telephone exchange system and an outgoing trunk extending to a local distributing center, Fig. 2;

Figs. 2, 3 and 4 taken together show apparatus at a local distributing center. Fig. 2 shows an extension of the trunk of Fig. 1 extending over a two-wire trunk to the intermediate distributing center, shown in Figs. 5 to 8, inclusive, with supervisory and alarm circuits individual to such trunk, and at the left portion of the figure, the supervisory circuits of other trunks similar to the trunk of Fig. 1 which are also multipled to the trunk of Fig. 2. Fig. 3 shows a one-way repeater for the trunk of Fig. 2, and Fig. 4 shows schematically alternate repeater, supervisory and alarm circuits, which may be used in place of similar circuits, shown in Figs. 2 and 3;

Figs. 5, 6, 7 and 8 taken together show apparatus at an intermediate distributing center. Fig. 5 shows the outgoing end of the trunk extending to the local distributing center of Figs. 2 to 4, inclusive. Fig. 6 shows the extension of the trunk of Fig. 5 together with the supervisory and alarm circuits thereof. Fig. 7 shows a one-way repeater for the trunk of Fig. 6, and Fig. 8 shows schematically alternate supervisory, repeater and alarm circuits which may be used in place of similar circuits shown in Figs. 6 and 7;

Fig. 9 shows the other end of the interoffice trunk extending to the intermediate distributing center of Figs. 5 to 8, inclusive, and apparatus of an outgoing distributing point;

Figs. 10 to 15, inclusive, taken together show apparatus at a central time announcing bureau. Fig. 10 shows one desk circuit at the central bureau; Fig. 11 shows the clock circuit; Fig. 12 shows the one-way repeater circuit; Fig. 13 shows the repeater alarm circuit; and Fig. 14 shows an oscillator circuit; the circuits of Figs. 11 to 14 inclusive, all being individual to the desk circuit of Fig. 10. Fig. 15 shows schematically an alternate desk and associated circuits, which may be used in place of the similar circuits shown in Figs. 10 to 14, inclusive;

Figs. 16 to 18, inclusive, show schematically the circuits of a typical time announcing system, Fig. 16 showing a plurality of offices from which calls for time of day service may be initiated and circuits of a local distributing center, Fig. 17 showing the circuits of an intermediate distributing center and Fig. 18 showing the circuits of an outgoing distributing point and the desk and associated circuits at a central time announcing bureau;

Fig. 19 is a diagram showing schematically the arrangement of trunking facilities for connecting a plurality of offices through local and intermediate distributing centers with a central time announcing bureau;

Fig. 20 is a diagram showing schematically an arrangement of trunking facilities similar to those of Fig. 19 but providing for serving a larger area through first and second intermediate distributing centers;

Fig. 21 is a diagram showing how Figs. 1 to 15, inclusive, should be assembled to disclose the detailed circuits of the invention; and Fig. 22 is a diagram showing how Figs. 16 to 18, inclusive, should be assembled.

*General description of the system.*

By referring first to Figs. 16 to 20, inclusive, a general comprehension of the scope and purpose of the invention may be obtained. As previously stated, the time of day announcing system in accordance with the present invention contemplates the establishment of a central bureau at which is positioned a special operator, who when demand arises, periodically announces the exact time within the nearest quarter minute. Obviously, if required such operator could be provided with facilities for announcing the time within closer limits, as for example to the nearest tenth of a minute. It is intended that the central bureau shall be accessible from a plurality of offices or exchange areas over a special trunk network fanned out from such bureau. To facilitate the interconnection of subscribers whose lines terminate in exchange offices of an area to be served by the central time bureau, the exchanges or offices of the area are divided into sections, all offices of a particular section having access to a local distributing center. From the local distributing centers of a plurality of sections, trunks extend to an intermediate distributing center. Thus, each intermediate distributing center is accessible from a plurality of local distributing centers and from the offices which have access to each local distributing centers. As many intermediate distributing centers would be provided as would be necessary to handle the traffic from the different sections of the area.

All of the intermediate distributing centers, in turn, are connected by trunks to an outgoing distributing point located contiguous to the central bureau, at which bureau the trunks incoming to the outgoing distributing point are connected to the desk circuit of the announcing operator. While the invention has been disclosed as applied to a system in which all sections of the area may be served through a single group of intermediate distributing centers, as disclosed diagrammatically in Figs. 16 to 18 and Fig. 19, it will be obvious that if the area to be served is extensive, as for example should the area be extended to include an entire Greenwich time zone, secondary distributing centers as disclosed diagrammatically in Fig. 20, or indeed tertiary distributing centers could be established. Should the area to be served be not extensive then the intermediate distributing centers could be omitted and trunks could be extended directly from the outgoing distributing point to the local distributing centers.

Figure 16:
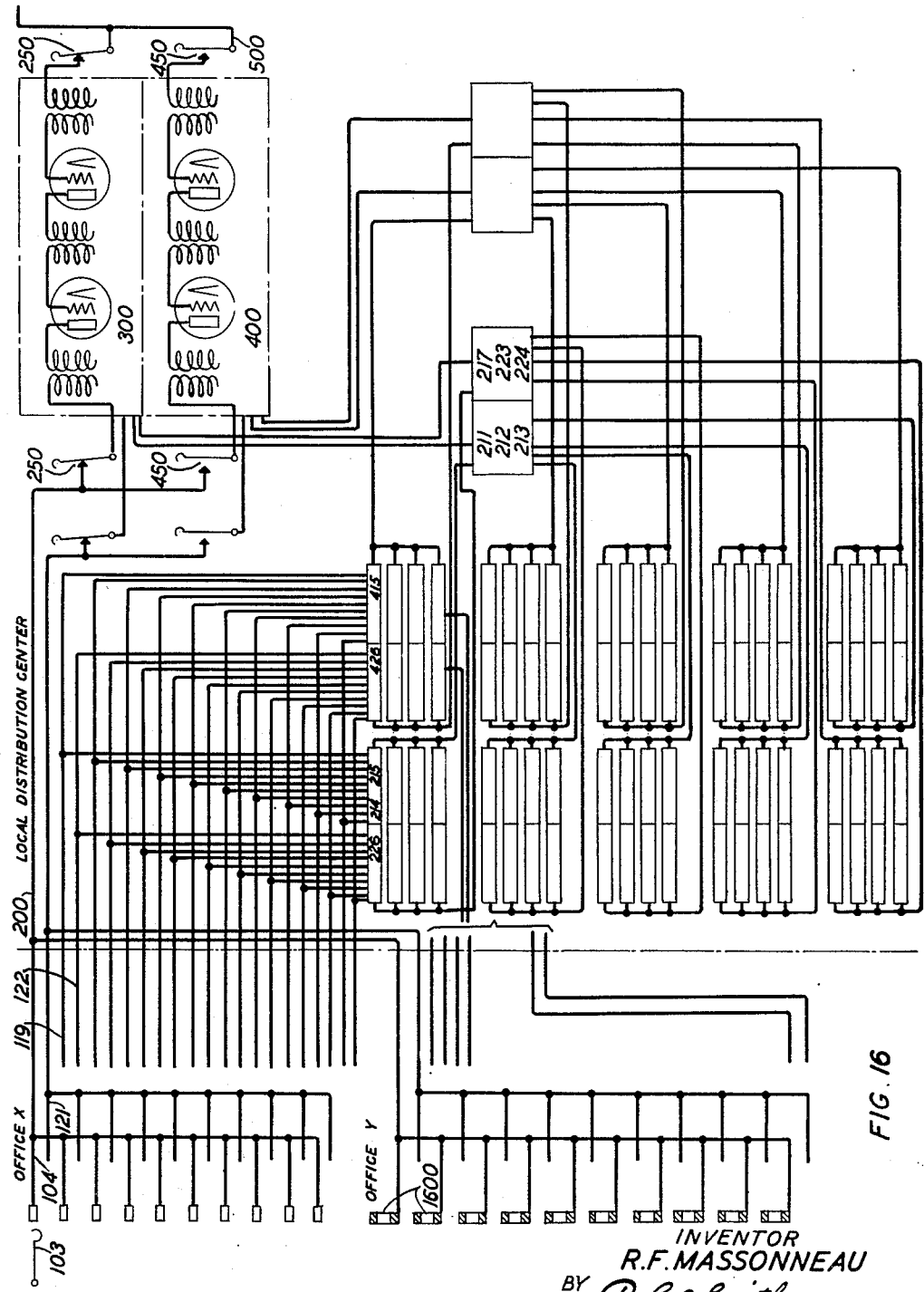

In Fig. 16 trunks outgoing from bank terminals of selectors of a dial switching office X are shown multipled together and connected at the local distributing center in the section of the area in which the office X is located, to a trunk 200 in which either the repeater 300 or the repeater 400 may be inserted by the operation of either switch 250 or switch 450. A second manual office Y is also disclosed having a plurality of trunks terminating therein in jacks 1600 before operators' positions, which trunks are also multipled together and are connected at the local distributing center to the trunk 200. The repeaters 300 and 400 are arranged to transmit voice currents in one direction only, that is, from the central bureau toward the calling lines in offices X or Y. From the input side of repeaters 300 and 400 a trunk 500 extends through the intermediate distributing center shown in Fig. 17 where it is multipled to other trunks incoming from other local distributing centers, such as that shown in Fig. 16 and extended through either repeater 700 or 800 to a trunk 900. Either repeater 700 or 800 may be inserted between the trunks 500 and 900 through the operation of switch 650 or switch 850.

The trunk 900 is multipled at the outgoing distributing point as disclosed in Fig. 18 to other similar trunks which extend to other intermediate distributing centers and the extension of these multipled trunks extends to the central bureau desk circuit 1000 through contacts of key 1050. An alternate desk circuit 1500 may be connected to the extended trunk circuit in place of desk circuit 1000 by the operation of key 1550 to the right and the operation of key 1050 to the left. Whenever a desk circuit is removed from service by the maintenance man through the operation of the associated key 1050 or 1550, it becomes connected to the test position 1800. An operator's position telephone set is shown at 1025 for connection by plug and jack connection to either desk circuit.

Supervision from the desk circuit out over the network of trunks extending through the outgoing intermediate and local distributing centers to all the local office trunks that may be at the time connected to the network, is controlled by groups of relays, indicated by the rectangles shown in Figs. 16, 17 and 18. Supervision is provided for the purpose of holding the talking conductors of local trunks, such as 104, open at the originating offices until just prior to quarter minute announcement periods.

*Initiation of a call*

With this general outline in mind, the invention will now be considered in more detail. Assume that a subscriber whose line 100 is located in office X initiates a call to obtain the correct time. When the subscriber on line 100 removes his receiver from the switch hook, he becomes connected by means of a line finder 101 of the well known type with a first selector 102, and in response to the dialing of the first two digits of the directory number assigned to the time announcing bureau, for example ME 4000 the first and second selector switches 102 and 103 are operated to select an idle outgoing trunk, for example, the trunk 104. Upon the seizure of the trunk 104, a circuit is established for the line relay 105 extending from battery, through the upper winding of relay 105, the No. 4 back contact of relay 106, the upper back contact of relay 107, ring conductor of trunk 104, thence over wipers of selectors 103 and 102 and line finder 101, over the calling line loop, wipers of line finder 101 and selectors 102 and 103, tip conductor of trunk 104, inner upper back contact of relay 107, No. 3 back contact of relay 106 to ground through the lower winding of relay 105. Relay 105 operates in this circuit and closes an obvious circuit for slow releasing relay 108. Relay 108 in turn connects ground from its inner upper front contact over the upper normal contact of jack 110 to the sleeve terminal of trunk 104 for the purpose of making the selected trunk busy to other selector switches such as 103, and for holding the operated selector switches from releasing.

When the calling subscriber dials the next or third digit of the designation, relay 105 responds to the subscriber's dial and upon each opening of the dialing circuit at the calling dial, closes a circuit which extends from ground at the back contact of relay 105, over the lower front contact of relay 108 to battery through the winding of slow releasing relay 109. Relay 109 operates and due to its slow releasing character remains operated until the impulses of the third digit series cease, and closes a circuit for stepping magnet 111 of the stepping switch 150 whose wipers and bank terminals are shown at 112 and 113. Magnet 111 energizes to advance wipers 112 and 113. As soon as the digit series terminates, relay 105 remains operated for a sufficient time before the next operation of the calling dial to permit relay 109 to release, in turn releasing magnet 111. In response to succeeding operations of the calling dial for the remaining digits of the central bureau directory number, the switch 150 is advanced one step upon the termination of each digit series.

It will be assumed that the central bureau number comprises six digits, two office code digits which set the selectors 102 and 103 and four additional digits which are instrumental in advancing the wipers of switch 150 four steps. The last four digit series of impulses are thus absorbed in the advancing of the switch 150. The number of digits to be absorbed by the stepping of switch 150 will depend upon the size of the exchange area in which the calling line is located and will also depend upon whether the trunk 104 terminates in the bank of first, second, third, fourth or fifth selectors. For this reason the switch 150 may be made to absorb from one to five digits, the number of digits which will be absorbed depending upon the terminals of the switch 150 to which conductors 114 and 115 are connected.

Upon the termination of the last digit series to be absorbed, the wipers 112 and 113 will be advanced to terminals connected respectively to conductors 114 and 115 and a circuit is established from the ringing machine 116 over wiper 113, conductor 115, the No. 2 back contact of relay 106, condenser 117, thence over the calling line loop to ground through the lower winding of relay 105, thus transmitting to the calling subscriber a ringing tone to inform him that he has become connected to the announcement network.

A second circuit is also prepared from battery through the winding of relay 118, conductor 114, wiper 112, normal contacts of relay 118 to conductor 119. With the switch 150 off-normal, a start circuit is closed from ground over the off-normal springs 120, start conductor 121, normal contacts 201 of switch 250, back contact of relay 202 to battery through the winding of start relay 203 at the local distributing center. Relay 203 operates and connects the polarized relays 204 to 207 inclusive to the conductors of trunk 500 in series with the windings of relays 501 and 502 at the intermediate distributing center. The circuit thus established may be traced from battery through the lower windings of relays 501 and 502, the lower back contact of relay 503, the lower left winding of repeating coil 504, lower contacts of jack 521, conductor 505 of trunk 500, contacts 208 of switch 250, lower right winding of repeating coil 209, upper contact of relay 203, windings of relays 204 to 207 inclusive, upper right winding of coil 209, contacts 210 of switch 250, conductor 506 of trunk 500, upper contacts of jack 521, upper left winding of repeating coil 504, upper back contact of relay 503 to ground through the upper windings of relays 502 and 501. Relays 204 and 207 are so polarized that they operate in this circuit but relays 205 and 206 being oppositely polarized, do not operate. Relays 501 and 502 also operate to perform functions to be described hereinafter. Relays 204 and 207 upon operating establish obvious circuits for relays 211, 212 and 213. It is to be noted in this connection that the start conductor 121 is multipled to all trunk circuits such as 104 extending from the several offices having access to the local distributing center disclosed in Figs. 2, 3 and 4, so that when any subscriber in such offices initiates a call for time of day service, the start relay 203 will be operated.

Relay 211 upon operating closes obvious circuits for relays 214 and 215. Relays 212 and 213 also close circuits for other relays similar to relays 214 and 215. Since it is possible to operate four relays similar to relays 214 and 215 over each grounded contact of relays 211, 212 and 213, it is possible to thus operate 20 relays, and since each relay such as 215 is capable when operated of connecting ground to five conductors such as 119, the operation of polarized relays 204 and 207 may thus control the grounding of one hundred conductors 119 of one hundred trunks 104. When conductor 119 of trunk 104 is grounded through the operation of relay 215, the circuit of pick-up relay 118 is completed and relay 118 operates and locks from battery through its winding over conductor 114, wiper 112, lower alternate contacts of relay 118 to ground at the upper front contact of relay 108. At its uppermost contact, relay 118 opens the circuit of rotary magnet 111 to prevent further stepping of switch 150, and at its upper front contact, prepares a circuit for relay 106 which will be described later. Similarly, the pick-up relay 118 of all trunks which have been seized for use by other subscribers in offices connected to the local distributing center are simultaneously operated through the operation of relays 214, 215, etc.

*Operation of line-in-trouble alarm*

Should the trunk circuit 500 be in trouble so that when the start relay 203 connects the relays 204 to 207 inclusive thereto, relays 204 and 207 do not operate and consequently relay 211 does not operate, a circuit is established for operating slow to operate relay 216 extending from battery, winding of relay 216, lower contact of relay 203, back contact of relay 211, back contact of relay 217 to ground. Relay 216 operates, causing slow to operate relay 218 and relays 219 and 220 to operate in turn. Relay 219 connects holding ground to the winding of start relay 203 to hold it operated until the trouble condition is removed, and relay 220 grounds conductors extending to the alarm board shown diagrammatically by the rectangle 221. This alarm board may comprise suitable lamps or signal devices for indicating to a maintenance man that a trouble condition exists on the trunk line.

In response to the alarm signals, the maintenance man depresses the key 222, thus releasing relay 220 which opens the circuit of the alarm signals and establishes over the upper contacts of key 222 a circuit for a guard lamp (not shown) on the alarm board 221. When the trouble condition is removed, relay 216 releases, in turn releasing relays 218 and 219. Relay 220 reoperates from ground at the back contact of relay 218 over the lower alternate contacts of key 222, causing the alarm signals to be reoperated. Since the guard lamp is at this time lighted, the reoperation of the alarm signals indicates to the maintenance man that the trouble has been cleared, whereupon he releases key 222 extinguishing the guard lamp and releasing relay 220.

*Start circuit extended from intermediate distributing center*

Figure 1:
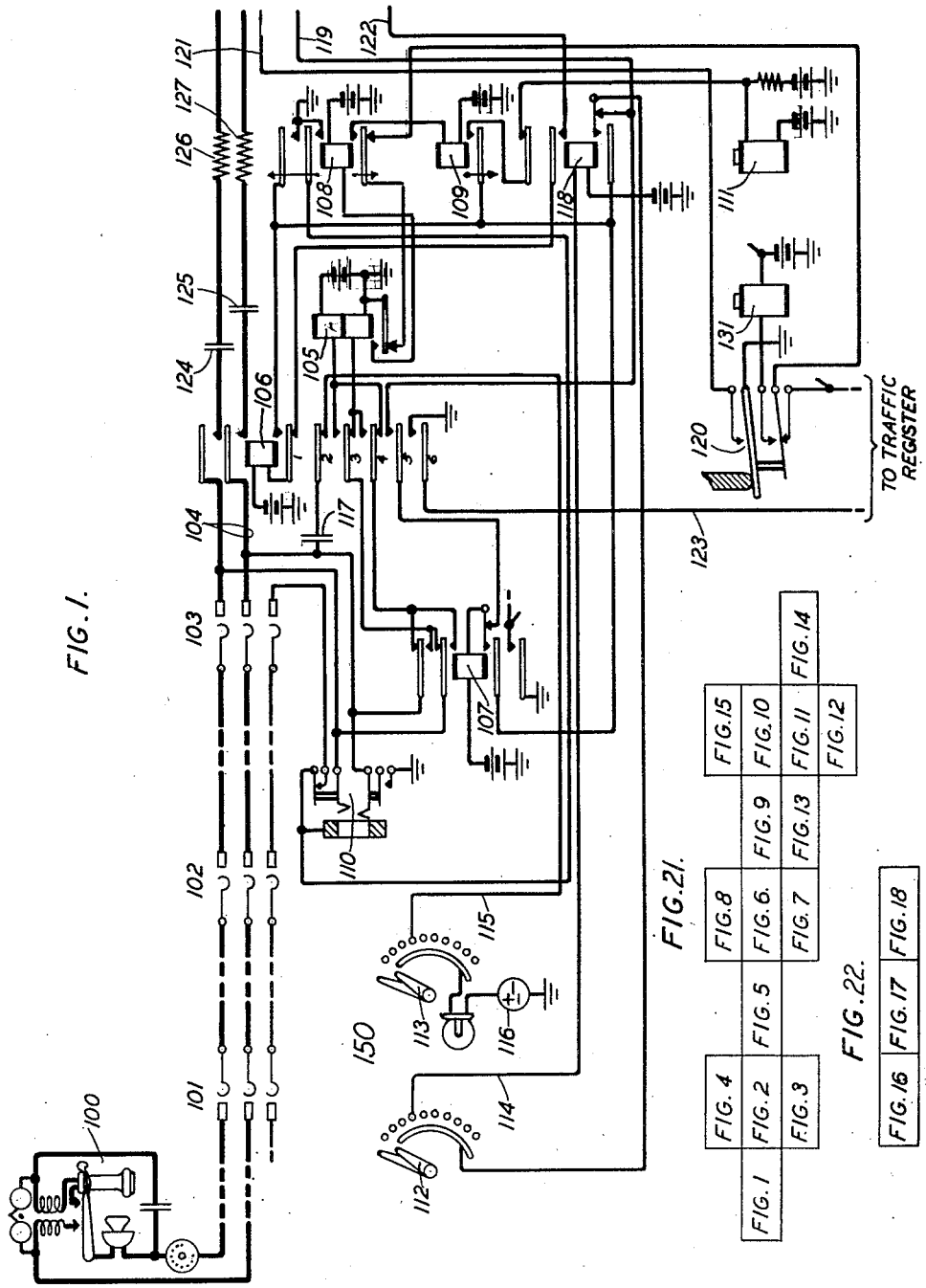
Figure 2:
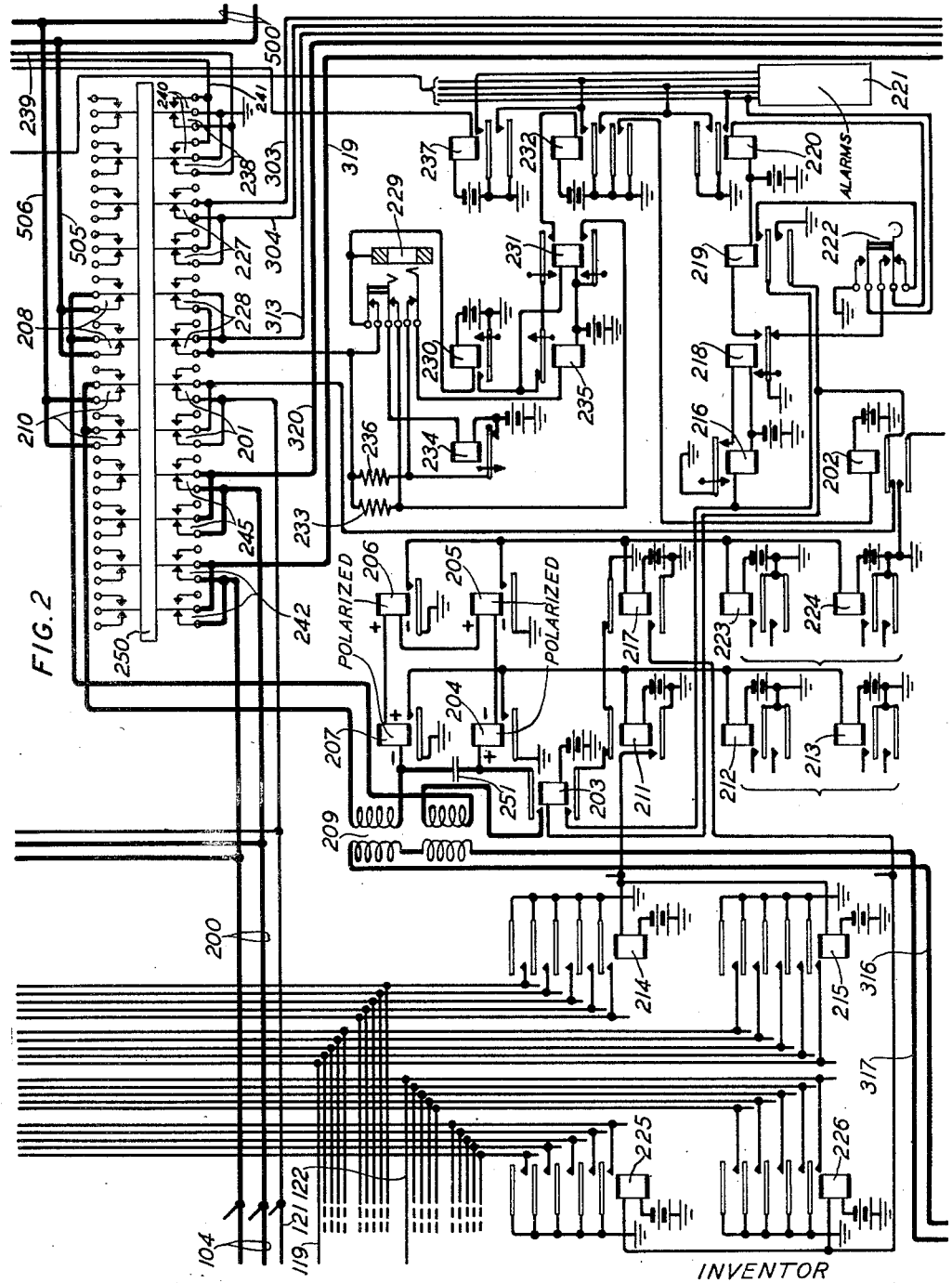
Figure 3:
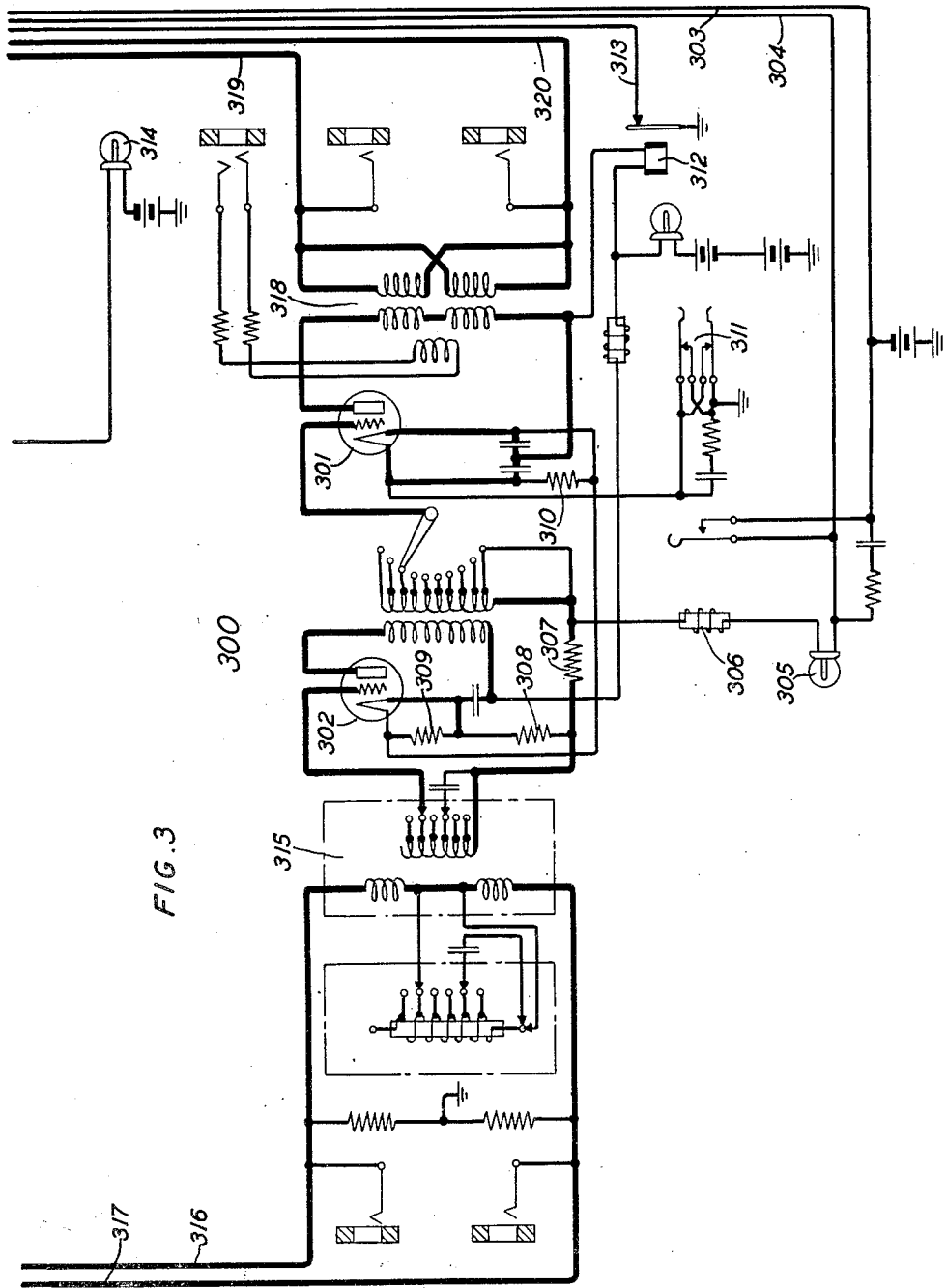
Figure 4:
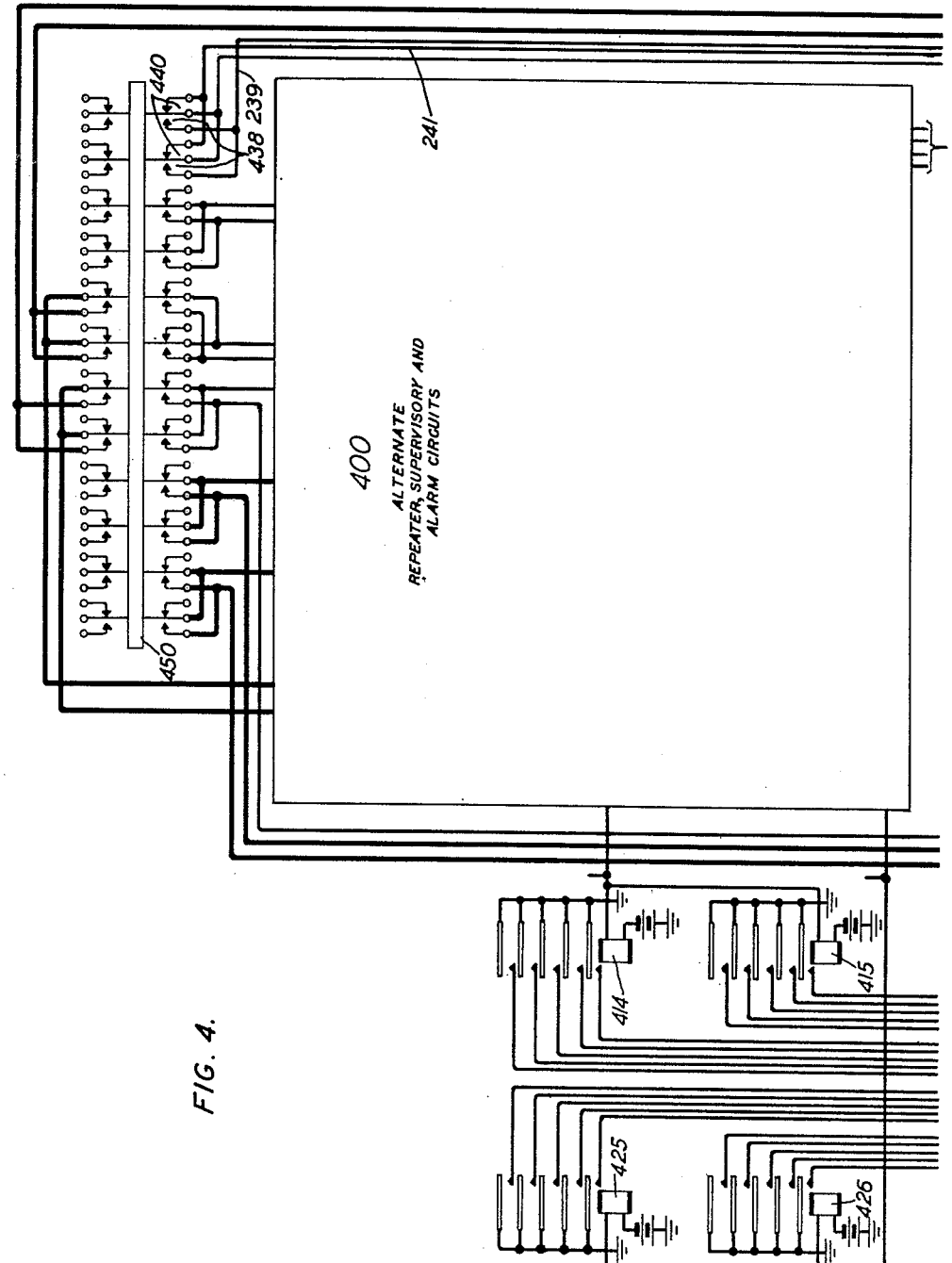

When relays 501 and 502 at the intermediate distributing center, Figs. 5 to 8 inclusive, operate as previously described, a start circuit is established from ground at the contacts of these relays over conductor 507 which is multipled to other start conductors controlled by similar relays 501 and 502 in trunks similar to trunk 500 incoming from other local distributing centers such as is shown in Figs. 2 to 4 inclusive, normal contacts 601 of key 650, back contact of relay 602 to battery through the winding of relay 603. Relay 603 which is slow to operate energizes, in turn closing an obvious circuit for slow to operate relay 604. Relay 604 connects the start conductor 507 to the winding of slow to release relay 605 which in turn causes the relay 606 to operate over a circuit from battery, winding of relay 606, contacts of relay 605 to ground at the back contact of relay 607. Relay 606 upon operating closes an obvious circuit for relay 602 which in turn disconnects relay 603 from the start conductor and bridges relays 608 to 611 inclusive across the conductors of trunk 900, which trunk extends to the outgoing distributing point shown in Fig. 9. Relay 603 upon deenergizing, opens the circuit of relay 604 which in turn opens the initial energizing circuit of relay 605, but relay 605 is held operated over the inner lower front contacts of relay 606 to ground on the start conductor 507. The purpose of the relay combination 603, 604, 605, 606 is to prevent a false starting signal from being given by a momentary operation of relays 501 and 502 which might be caused due to line surges when disconnection takes place.

If the trunk circuit 900 is in working condition, relays 609 and 610 operate in series with relays 901 and 902 at the outgoing distributing center, in a circuit extending from battery through the lower windings of relays 901 and 902, the lower back contact of relay 903, the lower left winding of repeating coil 904, lower contacts of jack 921, trunk conductor 905, contacts 612 of switch 650, the lower right winding of repeating coil 613, front contact of relay 602, windings of relays 608 to 611 inclusive, the upper right winding of repeating coil 613, contacts 614 of switch 650, trunk conductor 906, upper contacts of jack 921, upper left winding of coil 904, upper back contact of relay 903 to ground through the upper windings of relays 902 and 901. Relays 608 and 611 being polarized oppositely to relays 609 and 610, do not operate at this time. Relays 901 and 902 also operate for a purpose to be described later. Relays 609 and 610 upon operating, close an obvious circuit for relay 615 which at its upper back contact opens an operating circuit for relay 616.

*Operation of line-in-trouble alarm*

If a trouble condition exists on the trunk 900 and consequently relays 609 and 610 do not operate, a circuit is established from ground over the upper back contacts of relays 615 and 617, lower front contact of relay 606 to battery through the winding of relay 616. Relay 616 operates, causing slow to operate relay 618 and relays 619 and 620 to operate in turn. Relay 619 connects holding ground to the winding of relay 606 to hold it operated until the trouble condition is removed, and relay 620 grounds conductors extending to the alarm board shown diagrammatically by the rectangle 621. This alarm board may comprise suitable lamps and signal devices as desired for indicating to a maintenance man that a trouble condition exists on the trunk line. In response to the alarm signals the maintenance man depresses the key 622 thus releasing relay 620 which opens the circuit of the alarm signals, and establishes over the upper contacts of key 622 a circuit for a guard lamp (not shown) at the alarm board. When the trouble condition is removed, relay 616 releases through the operation of relay 615 or relay 617, in turn releasing relays 618 and 619. Relay 620 reoperates from ground at the back contact of relay 618 over the lower alternate contacts of key 622 causing the alarm signals to reoperate. Since the guard lamp is at the time lighted, the reoperation of the alarm signals indicates to the maintenance man that the trouble has been cleared, whereupon he releases key 622, extinguishing the guard lamp, releasing relay 620 which in turn opens the circuit of the alarm signals.

*Extension of start circuit to central bureau*

It will now be assumed that the operator is on duty at the central bureau and has plugged her announcing transmitter 1001 and headset 1002 by plugs 1003, 1004 and 1005 into jacks 1006, 1007 and 1008 of the desk circuit 1000 and that consequently relays 1009 and 1010 are operated, relay 1009 being operated over the make springs of jack 1006 and relay 1010 being operated in a circuit from battery through the upper winding of relay 1010, sleeves of jack 1006 and plug 1003, transmitter 1001, tips of plug 1003 and jack 1006, right windings of repeating coil 1011 to ground through the lower winding of relay 1010. Relay 1010 in turn closes an obvious circuit for relay 1012 which in turn closes an obvious circuit for relay 1013. Relay 1012 upon operating establishes the filament circuit for the repeater 1200 extending from battery, conductor 1201, lower contacts of relay 1012, conductor 1202, ballast lamp 1203, choke coil 1204, resistance 1205, resistance 1206, resistance 1207 and filament of vacuum tube 1208 in parallel, resistance 1209 and filament of vacuum tube 1210 in parallel, normal contacts of key 1211 to ground, thus lighting the filaments of the repeater 1200.

Relay 1013 upon operating closes an obvious circuit for relay 1014, prepares at its lowermost contacts a circuit for alarm relays 1301 and 1305 of the repeater alarm circuit 1300, and closes a break in the start conductor 907 at its upper contacts. If the vacuum tubes 1208 and 1210 have energized properly and cause the flow of space current, relay 1212 will be at this time energized and the circuit of relays 1301 and 1305 in the alarm circuit 1300 will not therefore be closed through the operation of relay 1013. Relay 1014 upon operating closes an obvious circuit for relay 1015 and a circuit for relay 1017 extending from battery winding of relay 1017, back contact of relay 1016 to ground at the upper contacts of relay 1014. At its inner lower front contact, relay 1015 connects battery to the filaments of the volume indicator 1018 which may be of the type disclosed in Patent No. 1,523,827 granted January 20, 1925 to E. L. Nelson, and at its lower contacts closes the filament circuit of the vacuum tubes 1401 and 1402 of the oscillator circuit 1400. This filament circuit may be traced from the filament battery through resistance 1403, the filaments of the tubes in series, resistances 1404 and 1405, conductor 1406, contacts of relay 1015, conductor 1407 to the other terminal of the filament battery.

Figure 7:
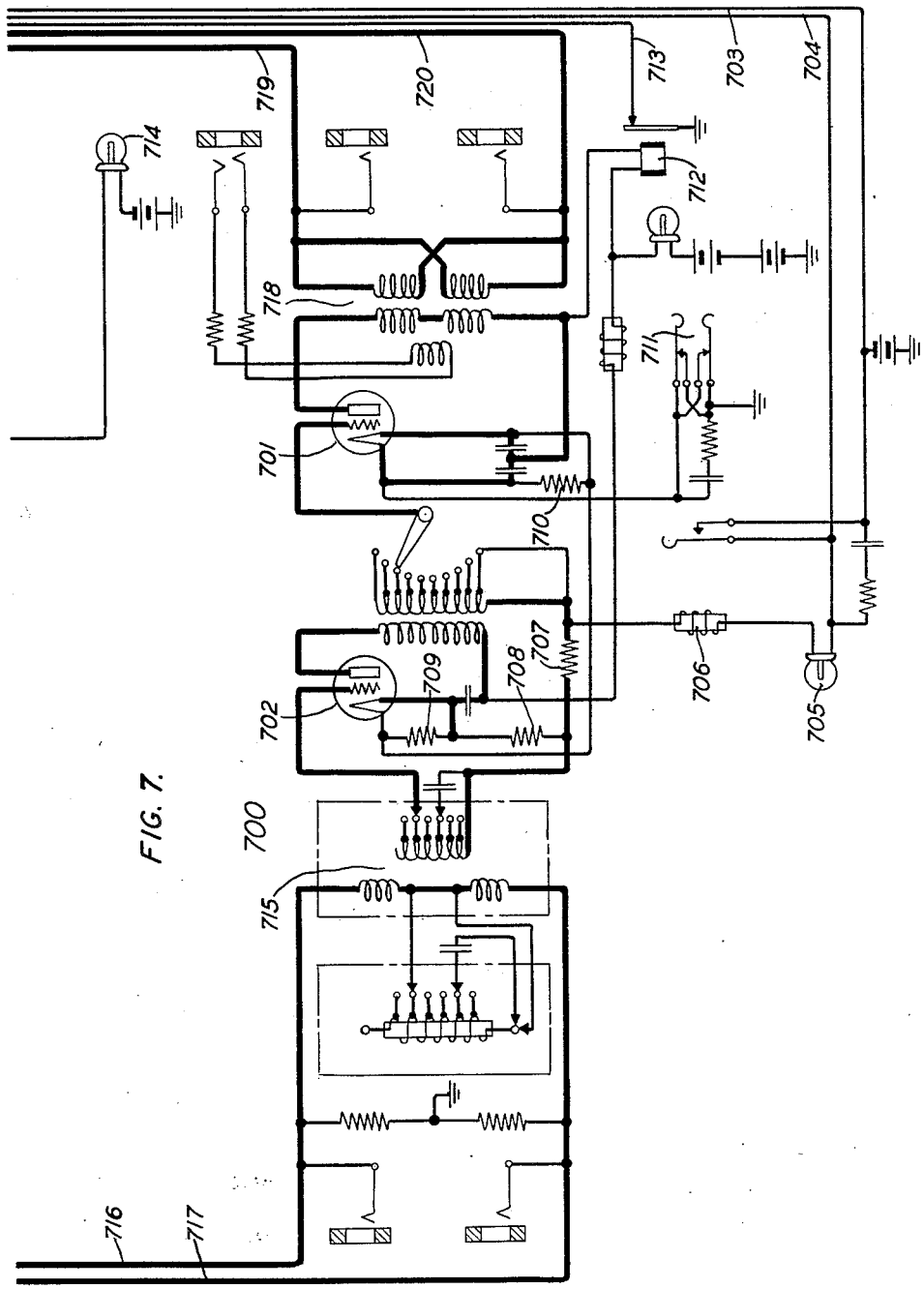
Figure 8:
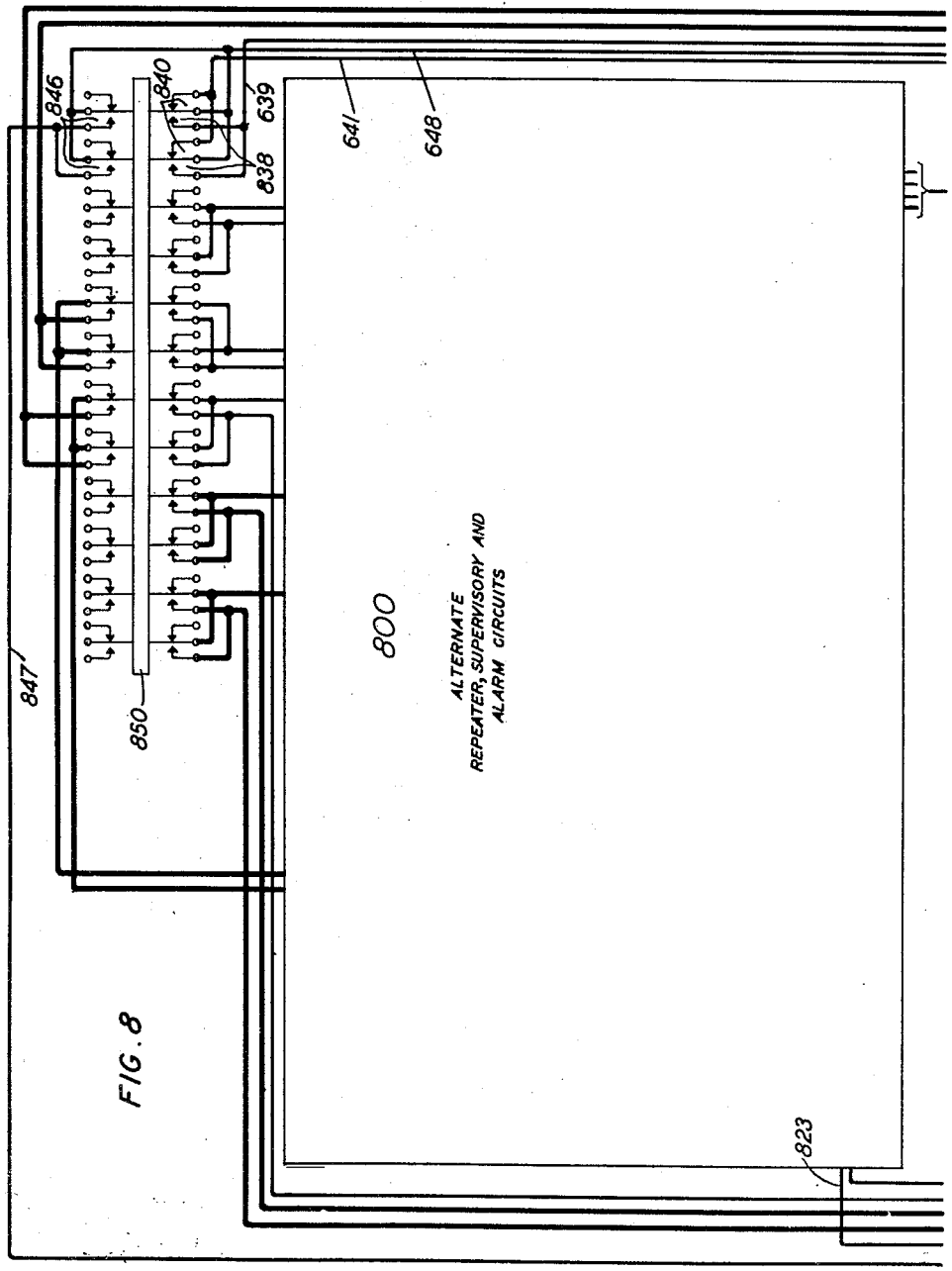
Figure 9:
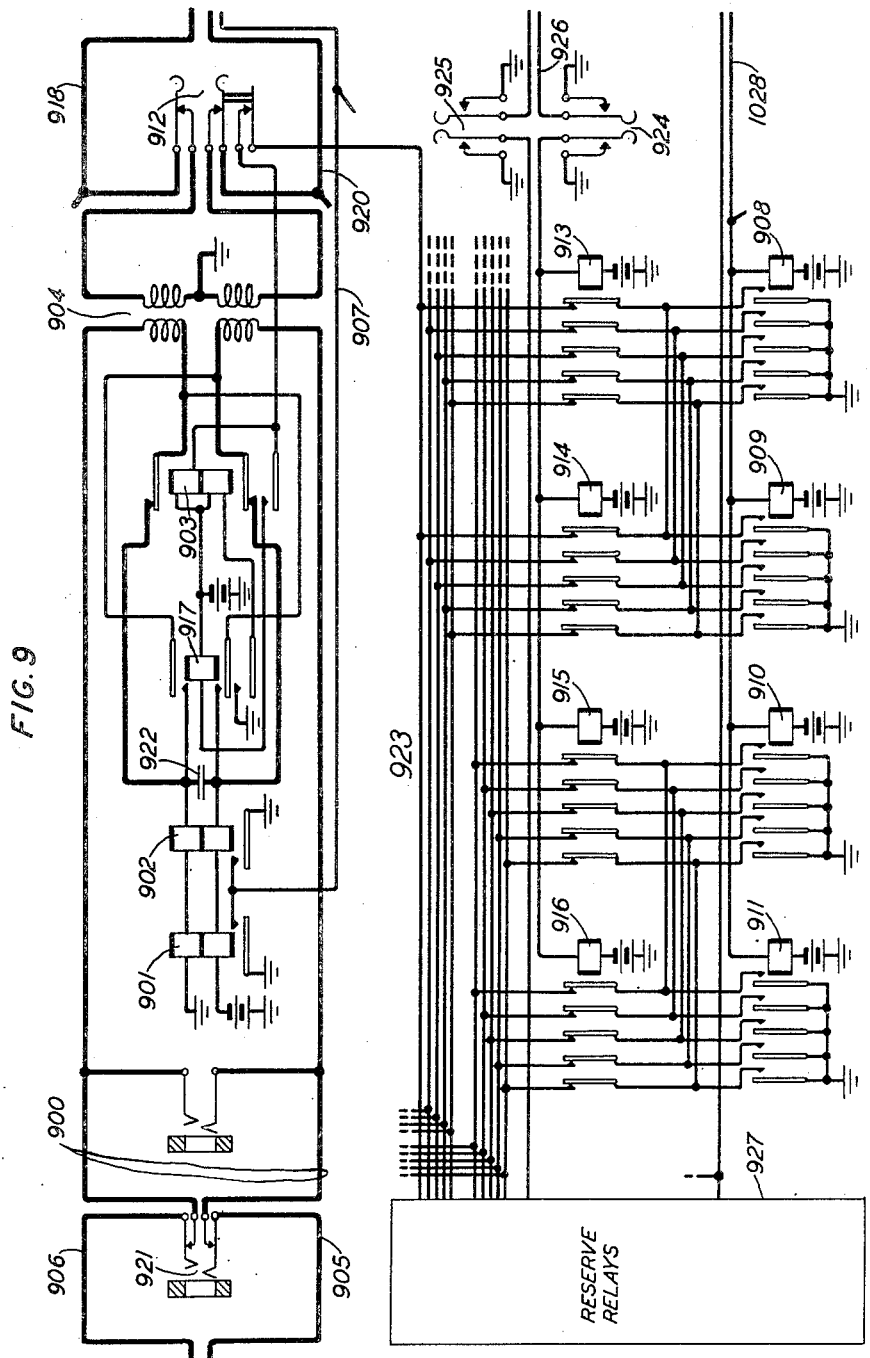

When relays 901 and 902 at the outgoing distributing point, Fig. 9, operate as previously described, a start circuit is established from ground at the contacts of these relays over conductor 907 which is multipled to other start conductors controlled by similar relays 901 and 902 in trunks similar to trunk 900 extending from other intermediate distributing centers, such as is shown in Figs. 5 to 8 inclusive, upper front contact of relay 1013, back contact of relay 1019 to battery through the winding of relay 1020. Relay 1020 which is slow to operate in turn establishes an obvious circuit for slow operating relay 1021 which in turn operates and connects the winding of relay 1022 to the start conductor 907. Relay 1022 which is slow to release, in turn closes an obvious circuit for relay 1023. Relay 1023 connects the start conductor 907 directly to the winding of relay 1022, closes an obvious circuit for relay 1019 and an obvious circuit for call lamp 1024. Lamp 1024 lights as a signal to the operator that a call for time of day has been initiated by a calling subscriber.

When relay 1019 operates it opens the circuit of relay 1020 which releases, in turn releasing relay 1021. Relay 1021 in turn opens the initial operating circuit of relay 1022, but relay 1022 is now held operated over the upper contacts of relay 1023 so that relays 1023 and 1022 remain operated so long as there is a ground on start conductor 907, indicating that a demand exists somewhere in the area for time of day service. The purpose of the slow to operate relays 1020 and 1021 is to prevent a false signal from being given by reason of a momentary operation of relays 901 and 902 which might be caused due to line surges when disconnection takes place. The slow to release relay 1022 is used to hold relay 1023 operated over the period when relays 901 and 902 momentarily release when battery and ground are reversed through their windings as will be hereinafter described.

Figure 10:
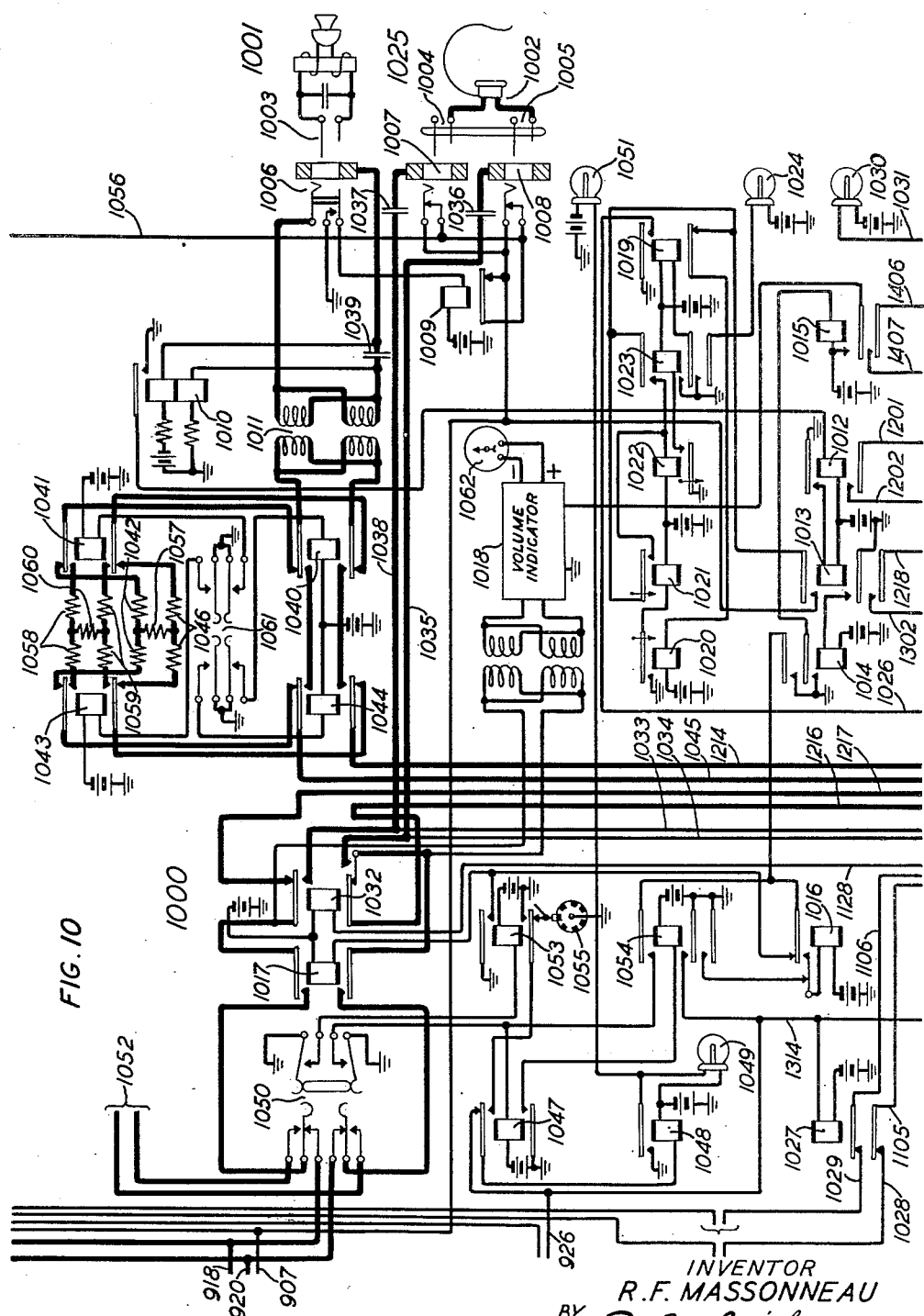

When relay 1019 operates, it establishes a circuit from ground over its upper contact, conductor 1026, the normal contacts of relay 1100 to battery through the winding of relay 1101. Relay 1101 upon operating prepares a holding circuit for itself and establishes a circuit for relay 1102 extending from battery, winding of relay 1102, back contact of relay 1103, upper back contact of relay 1104 to ground at the lower contact of relay 1101. The operation of relay 1102 connects ground to conductors 1105 and 1106 which extend through back contacts of relay 1027 to conductors 1028 and 1029 extending to the outgoing distributing point and conductor 1028 extending thence through the windings of relays 908 to 911 inclusive in parallel to battery. Conductor 1028 may also extend through the windings of a second group of four similar relays as indicated in Fig. 18 if the area is large enough to require more trunks outgoing from the central bureau than can be served by the four relays 908 to 911 inclusive. Conductor 1029 in a similar manner may be extended through the windings of four or eight additional relays similar to relays 908 to 911 inclusive as indicated in Fig. 18. It will be noted that relays such as 908 and 910 each serve five outgoing trunks such as 900, and consequently as many as forty trunks may be served, although it is intended that not more than thirty-six working trunks shall be connected at one time to the desk circuit of Fig. 10, the remaining four trunks being held in reserve for emergency purposes.

Transmission of cut through supervisory signal

When ground is connected to conductor 1028 and relay 908 operates, it establishes a circuit for relay 903 extending from battery, upper winding of relay 903, lower contacts of key 912, inner back contact of relay 913 to ground at the inner front contact of relay 908. Relay 903 upon operating in turn extends operating ground from the front contact of relay 908 over the front contact of relay 903 to battery through the winding of relay 917. Relay 917 upon operating establishes a holding circuit from ground at its lower contact through the lower winding of relay 903. When relay 903 operates, it disconnects the upper windings of relays 901 and 902 and ground from trunk conductor 906 and the lower windings of relays 901 and 902 and battery from trunk conductor 905, and when relay 917 operates, the upper windings of relays 901 and 902 and ground are reconnected to trunk conductor 905 and the lower windings of these relays and battery are reconnected to trunk conductor 906, thus reversing the direction of current flowing over the conductors of trunk 900. In a similar manner relays 908 to 911 inclusive and other relays connected to conductors 1028 and 1029 cause a current reversal on other trunks similar to trunk 900.

The reversal of current flowing over trunk 900 now causes the release of polarized relays 609 and 610 at the intermediate distributing center and the operation of polarized relays 608 and 611. Relays 608 and 611 upon operating close an obvious circuit for relay 617 which in turn opens the circuit of alarm relay 616 and connects ground to conductors 623 and 624. Conductor 623 extends to battery in parallel through the windings of relay 508 to 511 inclusive and may also extend through the windings of a second group of four similar relays as diagrammatically shown in Fig. 17 if the area is large enough to require more trunks similar to trunk 500 outgoing from the intermediate distributing center than can be served by the four relays 508 to 511 inclusive. Conductor 624 in a similar manner may extend through the windings of four or eight additional relays similar to relays 508 to 511 inclusive as diagrammatically indicated in Fig. 17. It will be noted that relays such as 508 and 510 each serve five outgoing trunks such as 500 and consequently as many as forty trunks may be served although it is intended that not more than thirty-six working trunks shall be connected at one time to the trunk conductors 643, 644, the remaining four trunks being held in reserve for emergency purposes.

When ground is connected to conductor 623 and relay 508 operates, it establishes a circuit for relay 503 extending from battery, upper winding of relay 503, lower contacts of key 512, inner back contact of relay 513 to ground at the inner front contact of relay 508. Relay 503 upon operating in turn extends operating ground from the front contact of relay 508 over the front contact of relay 503 to battery through the winding of relay 517. Relay 517 upon operating establishes a holding circuit from ground at its lower contacts, through the lower winding of relay 503. When relay 503 operates it disconnects the upper windings of relays 501 and 502 and ground from trunk conductor 506 and the lower windings of these relays and battery from trunk conductor 505 and when relay 517 operates, the upper windings of relays 501 and 502 and ground are connected to trunk conductor 505 and the lower windings of these relays and battery are connected to trunk conductor 506, thus causing a reversal of the current flowing over the trunk 500 to the local distributing center.

The reversal of current flowing over trunk 500 now causes the release of polarized relays 204 and 207 and the operation of polarized relays 205 and 206. Relays 204 and 207 upon releasing in turn release relays 211, 212, and 213 which in turn release all relays 214 and 215 which have been operated. Relays 205 and 206 upon operating close obvious circuits for relays 217, 223 and 224. Relay 217 upon operating closes obvious circuits for relays 225 and 226 and relays 223 and 224 also close circuits for other relays similar to relays 225 and 226. Since it is possible to operate four relays similar to relays 225 and 226 over each grounded contact of relays 217, 223 and 224, it is thus possible to operate twenty relays, and since each relay such as 226 is capable when operated of connecting ground to five conductors such as 122, the operation of polarized relays 205 and 206 may thus control the grounding of one hundred conductors 122 of one hundred trunks 104.

When relay 226 operates to connect ground to conductor 122 with relay 118 operated as previously described, a connection is extended from ground on conductor 122 through the No. 1 back contact and winding of relay 106 to battery. Relay 106 operates and locks over its No. 1 front contact to ground at the upper contact of relay 108, disconnects the source of tone current 116 from the calling line at its No. 2 back contact, connects ground over its No. 6 contact to conductor 123 extending through a traffic register circuit to provide a peg count registration of the call, disconnects conductor 122 from its winding and at its Nos. 3 and 4 contacts reverses the connection of battery and ground from the windings of relay 105 to the calling line for supervisory purposes such as coin box or message register operation. The operation of relay 106 also closes the talking conductors of trunk 104 through condensers 124 and 125 and resistances 126 and 127 to trunk 200 of the transmission network, thus bridging the calling line 100 on in parallel with other subscribers who are receiving service at the same time. The calling subscriber can now hear the announcement but disturbances or cross-talk between his line and the network are very largely prevented by condensers 124 and 125 and resistances 126 and 127.

Operation of clock circuit

Returning now to the operations which take place at the central bureau, it will be recalled that relay 1102 operated to transmit supervisory impulses for causing all connected subscribers' lines which have initiated calls for time of day service to be cut through to the transmission network. A further consideration of the clock circuit disclosed in Fig. 11 will now be had. The central bureau is provided with a master clock disclosed in the dot and dash rectangle 1107 which is synchronized by a district master clock every hour. Impulses sent out by the district master clock operate relay 1108 which connects battery to the synchronizing magnet 1109, thus keeping the master clock 1107 in synchronism with the district master clock. The winding contacts 1110 of the master clock are arranged to close every 60 minutes and to remain closed from six to seven seconds to cause the intermittent operation of the winding magnet 1111. The magnet may also be operated independently by the winding key 1112.

The master clock 1107 is arranged to close a circuit for relay 1113 through normal contacts of jack 1114, switch 1115, clock contacts 1116 to ground. Contacts 1116 close for a period of 0.5 of a second every 7½ seconds and thus operate relay 1113 for 0.5 of a second every 7½ seconds. On the even hour or 15 minutes past the hour, depending on whether the correction of the clock from the district clock is made on the even hour or 15 minutes past the hour, the contacts 1117 close and the contacts 1116 are lifted off the operating cam of the clock, the relay 1113 at that time operating over the hour contacts 1117. Each time that relay 1113 operates, it closes a circuit over the right normal contacts of key 1118 through the winding of magnet 1119 of the electric position clock 1120.

When the time indicated by the position clock 1120 does not agree with the time indicated by the master clock 1107 it may be reset by the operation of key 1118 to its right or stop position or to its left or step position as required. If the position clock is behind the master clock, by operating the key to the step position in which position it does not lock, the clock magnet 1119 will be given an additional impulse over a circuit extending through the magnet winding, right normal contacts of key 1118 to ground over the left alternate contacts of key 1118 to advance the clock 7½ seconds. As many operations of key 1118 to the left may be made as may be required to properly synchronize the clock 1120 with the master clock 1107. If the position clock is ahead of the master clock, the key 1118 may be operated to its right or locking position, thereby stopping the advance of the position clock until it indicates the correct time. This clock 1120 should should read 7½ seconds faster than the master clock. It is in the form of a veedometer and is graduated in quarter-minutes, minutes and hours. When the time is 7½ seconds past the even minute, the fractional minute wheel of clock 1120 should read one quarter, and when it is 15 seconds past the minute there should be no indication on the fractional minute wheel. The same applies for the one-half, three-quarters and even minute.

Each time that relay 1113 operates from the master clock circuit in addition to advancing the position clock, it also closes a circuit extending from battery through resistance 1121, winding of relay 1122, lower normal contacts of relay 1104 to ground at the upper contacts of relay 1113, and from battery through resistance 1123, winding of relay 1124, normal contacts of relay 1104 to ground at the upper contacts of relay 1113. Relay 1122 operates, but relay 1124 does not, as it is at the time shunted over its lower back contacts by ground on the upper contacts of relay 1113. Relay 1122 upon operating causes relay 1104 to operate over a circuit extending through the winding of relay 1104, front contact of relay 1122 to ground at the back contact of relay 1125. Relay 1104 at its upper back contact opens the circuit of relay 1102 which as will be recalled, was instrumental in causing current reversals at the outgoing and intermediate distributing centers for causing subscribers' lines to be cut through to the network. At its lower alternate contacts, relay 1104 establishes a holding circuit for relay 1122 extending through the winding of relay 1122, alternate contacts of relay 1104 to ground at the back contact of relay 1125.

After 0.5 of a second, relay 1113 releases and opens at its upper contact, the shunt circuit around the winding of relay 1124, whereupon relay 1124 operates over the locking circuit of relay 1122 and closes an obvious circuit for relay 1100, which in turn closes an obvious circuit for relay 1103 and closes a locking circuit for relay 1101 extending over the upper contacts of relay 1101, the upper alternate contacts of relay 1100 to ground on the start conductor 1026. Relay 1103 upon operating closes an obvious circuit for relay 1126, opens another point in the circuit of relay 1102 and closes a circuit for announcing lamp 1030, extending over conductor 1031, the upper front contact of relay 1103, the upper front contacts of relay 1104, to ground at the lower contact of relay 1101. The lighting of lamp 1030 is a signal to the operator that she should announce into her transmitter 1001 the time indicated on the position clock 1120. She may, for example, use the expression "When you hear the tone signal it will be exactly 5¾ minutes after five o'clock". The transmission circuit by means of which the announcement is transmitted to calling subscribers connected to the network will be described hereinafter.

After approximately 7½ seconds, the contacts 1116 again close and relay 1113 operates, causing the clock 1120 to advance 7½ seconds and closing a shunt around the winding of relay 1122 extending from ground at the back contact of relay 1125, alternate contacts of relay 1104, winding of relay 1122, lower front contacts of relay 1124 to ground at the upper contact of relay 1113. Relay 1122 thereupon releases and closes a circuit for relay 1127 extending through the winding of relay 1127, lower front contact of relay 1126, back contacts of relay 1122, upper contacts of relay 1101, upper alternate contacts of relay 1100 to ground on conductor 1026. Relay 1122 also connects ground from conductor 1026 over the inner front contact of relay 1126, conductor 1128 to battery through the winding of relay 1032, thereby operating relay 1032, and also opens the circuit of relay 1104 which thereupon releases. The release of relay 1104 opens the circuit of the announcement lamp 1030.

With relays 1127 and 1032 operated, a tone circuit is established from the oscillator 1400 to the talking conductors of the desk circuit 1000 which may be traced from conductor 918, left normal contacts of key 1050, upper front contacts of relays 1017 and 1032, conductor 1033, upper contact of relay 1127, left windings of repeating coil 1129, lower contact of relay 1127, conductor 1034, lower alternate contacts of relay 1032, lower contacts of relay 1017, left normal contacts of key 1050 to trunk conductor 920. From trunk conductors 918 and 920, this circuit is extended to the calling subscriber's line as will be hereinafter described. Tone current is induced from the oscillator circuit 1400 through the right winding of repeating coil 1129 over conductors 1408 and 1409. The operator is also enabled to hear this tone for checking purposes over a circuit extending from conductor 1033, conductor 1038, condenser 1037, sleeves of jack 1007 and plug 1004, headset receiver 1002, sleeves of plug 1005 and jack 1008, condenser 1036, conductor 1035 and conductor 1034.

When relay 1113 releases when contacts 1116 of clock 1107 again open after 0.5 of a second, relay 1124 which has been held operated over the lower normal contacts of relay 1104 and the upper contact of relay 1113 releases in turn releasing relays 1100, 1103, 1126, 1127 and 1032. Relay 1101 will remain operated if a call still exists for time of day service, and with relays 1104 and 1103 released, will again close the circuit of relay 1102 which will perform the function previously described of causing a cut through of any subscribers' lines which may have initiated calls during the preceding 7½ seconds. The clock circuit thus functions to cause a cut through signal to be sent out upon the network followed by the lighting of the announcement lamp 1030 and then followed by the application of a tone signal from the oscillator 1400 every 15 seconds as long as there are existing calls. The cutting through of the trunks which have waiting calls occurs approximately 0.5 of a second before the announcement lamp 1030 at the desk is lighted.

At the beginning of the announcement period, relay 1100 is operated as previously described. In the event that there is no call waiting at this time, relay 1101 will not be operated, and consequently ground will not be connected to light the announcement lamp 1030. If a call waiting condition arises after relay 1100 operates, ground is connected to conductor 1026, but relay 1101 cannot then operate as it is disconnected from conductor 1026 at the uppermost contact of relay 1100. After the announcement period, relay 1100 releases as previously described, causing relay 1102 to operate. At the beginning of the next 7½ seconds before the succeeding quarter of a minute, the lamp 1030 will light as previously described. This arrangement insures that the announcement lamp will always be lighted at the beginning of the announcement period in order to give sufficient time to make a complete announcement. When there is no call waiting and therefore no ground on conductor 1026, relays 1113, 1122, 1124, 1104, 1100, 1103 and 1126 operate in the manner previously described, but relays 1101, 1102, 1127 and 1032 do not operate.

Figure 11:
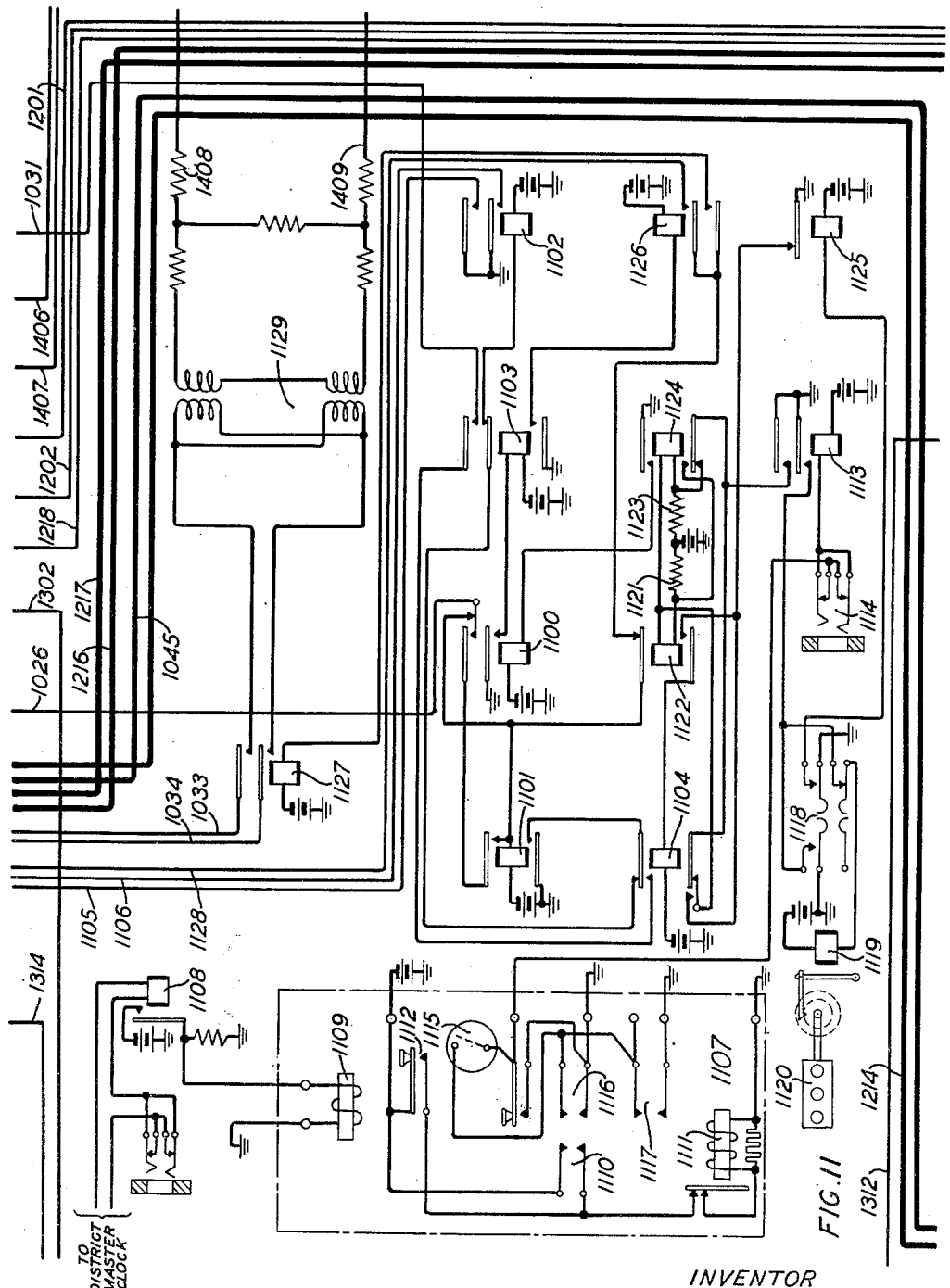

In order to have the clock circuits of Fig. 11 synchronized to indicate the start of the announcement period to the operator 7½ seconds before the quarter minute periods, it is necessary to operate relay 1122 with relay 1124 short-circuited. This condition may be obtained without disturbing the position clock 1120, by operating the key 1118 to the right and then releasing it to normal during the first half of any quarter of a minute as read on the second hand of the master clock 1107 or during the period the second hand is passing over a white segment of the second hand dial. When key 1118 is thus operated, relay 1125 operates and removes the operating ground from relay 1104. When the key is restored, relay 1125 releases.

*Operation of repeater at local distributing center*

It will be assumed that the switch 250 at the local distributing center, the switch 650 at the intermediate distributing center and key 1050 at the desk circuit are all in their normal positions. With switch 250 normal, filament battery is connected to the filaments of tubes 301 and 302 of repeater 300 from battery over conductor 303, normal contacts 227 of switch 250, conductor 304, ballast lamp 305, choke coil 306, resistances 307 and 308, resistance 309 in parallel with the filament of tube 302, resistance 310 in parallel with the filament of tube 301, normal contacts of key 311 to ground. If the tubes are properly energized and emit space current relay 312 will operate. If, however, the filaments do not light or the tubes do not emit space current, relay 312 will not operate, and a circuit is therefore closed from ground at the back contact of relay 312, over conductor 313, contacts 228 of switch 250, upper normal contacts of jack 229 to battery through the winding of slow to operate relay 230, and through resistance 233 and the inner normal contacts of jack 229 through the winding of slow to release relay 234. Relay 234 operates first and removes a short circuit from relay 235 extending from battery through the winding of relay 235, lower normal contacts of jack 229 to battery at the back contact of relay 234, thus permitting relay 235 to operate over the lower normal contacts of jack 229, resistance 236 to grounded conductor 313. Relay 235 upon operating opens the operating circuit of relay 232. When relay 230 operates it causes the operation of relay 231 which is also a slow to operate relay. As soon as relay 231 operates it closes a short circuit around the winding of slow to release relay 234 which after an interval releases, again short-circuiting relay 235 causing it to release. With relay 235 released and relay 231 operated, relay 232 operates and causes the operation of relay 202 and the closure of circuits for alarm signals on the alarm board 221. The operation of relay 202 opens the start circuit extending to the winding of relay 203, whereupon if calls come in to the local distributing center they will not be extended until the trouble condition is removed. Relay 202 also closes the circuit of trouble lamp 314 on the repeater panel. The group of slow to operate and slow releasing relays 230, 231, 234 and 235, provides a sufficient delay before the operation of alarm signals to permit the tubes of the repeater 300 to become heated up when the repeater is placed into service.

If the trouble lamp 314 lights, the maintenance man, by throwing switch 250 to the right, can remove the circuits of Figs. 2 and 3 from service. He then throws switch 450 of the emergency equipment, Fig. 4, to the left. A repeater similar to repeater 300 and supervisory and alarm equipment similar to that shown in Fig. 2, which is diagrammatically indicated in Fig. 4 by the rectangle 400, is then inserted between trunk 200 and trunk 500. In this connection it should be noted that switches 250 and 450 should not be operated in the same direction at one time. If both switches should through error be in the position in which switch 250 is shown, that is, thrown to the left, a circuit would be established from battery, winding of relay 237, contacts 438 of switch 450, conductor 239, contacts 238 of switch 250 to ground. Relay 237 will then operate closing alarm signals at the alarm board 221. Similarly if both switches 250 and 450 should be thrown to the right, the circuit of relay 237 will be completed from battery through the winding of relay 237, contacts 440 of switch 450, conductor 241, contacts 240 of switch 250 to ground. The maintenance man, noting the alarm signals will then throw the keys properly so that one, and only one, repeater circuit will be in service.

Operation of repeater at intermediate distributing center

With switch 650 normal or in the position shown, filament battery is connected to the filaments of tubes 701 and 702 of repeater 700 from battery over conductor 703, normal contacts 627 of switch 650, conductor 704, ballast lamp 705, choke coil 706, resistances 707 and 708, resistance 709 in parallel with the filament of tube 702, resistance 710 in parallel with the filament of tube 701, normal contacts of key 711 to ground. If the tubes are properly energized and emit space current, relay 712 will operate. If however, the filaments do not light or the tubes fail to emit space current, relay 712 will not operate and ground will therefore be connected to conductor 713, thereby causing the operation of relays 630, 631, 632, 634, 635 and 607, the lighting of trouble lamp 714 on the repeater panel 700 and the operation of alarm signals on the alarm board 621 in exactly the same manner as previously described in connection with the similar circuits of Figs. 2 and 3. Alarm signals are also operated on the alarm board 621 through the operation of relay 637 in the manner previously described in connection with the circuits of Figs. 2 and 4 should both switches 650 and 850 be both operated at the same time either to the left or to the right.

Transmission of announcement of time

Figure 12:
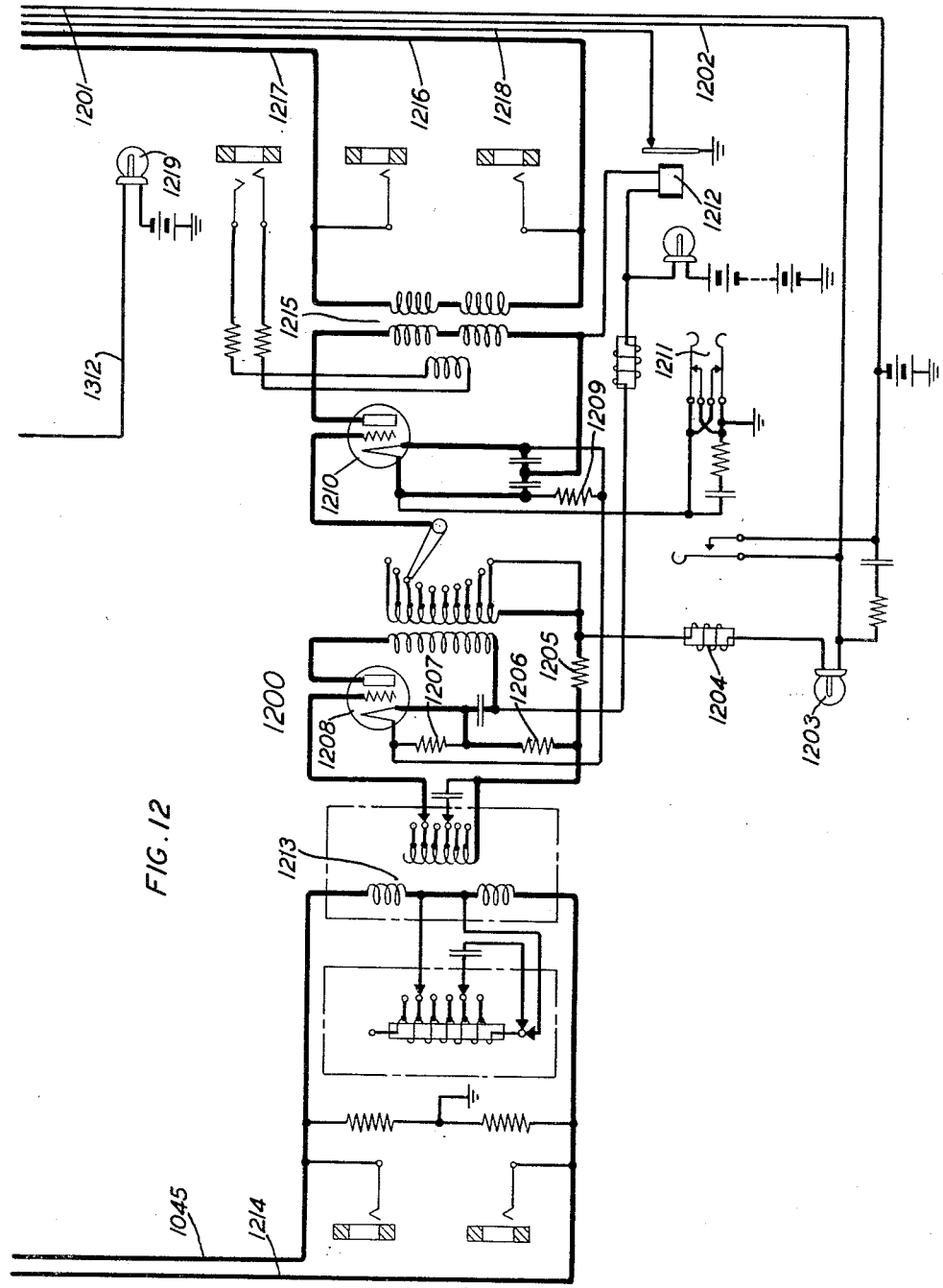

Assuming that at the time the central bureau operator makes a time announcement in response to the lighting of announcement lamp 1030, the repeater circuits of Figs. 3, 7 and 12 are functioning properly and have been placed in service through the proper operation of switches 250 and 650 and key 1050 as previously described, voice current will be transmitted from the announcing transmitter 1001 over tips of plug 1003 and jack 1006, right windings of repeating coil 1011, condenser 1039, rings of jack 1006 and plug 1003 to the transmitter, the transmitter being supplied with current through the windings of relay 1010. Induced current will then flow from the left windings of repeating coil 1011, upper back contact of relay 1040, upper back contact of relay 1041, padding resistances 1042 and 1057, upper back contacts of relays 1043 and 1044, conductor 1045, left windings of input transformer 1213, conductor 1214, lower back contacts of relays 1044 and 1043, padding resistances 1046, back contacts of relays 1041 and 1040 to the left windings of repeating coil 1011. The induced current is impressed on the right winding of input transformer 1213 and is then amplified in the well known manner by tubes 1208 and 1210 of repeater 1200 and impressed upon the left windings of output transformer 1215. Current induced into the right windings of transformer 1215 flows in a loop circuit over conductor 1216, lower normal contacts of relay 1032, lower contact of relay 1017, lower left normal contacts of key 1050, conductor 920, normal contacts of key 912 through the right windings of repeating coil 904, upper normal contacts of key 912, conductor 918, upper normal contacts of key 1050, upper contact of relay 1017, upper normal contact of relay 1032, conductor 1217 to the right windings of transformer 1215.

Current flowing through the right windings of repeating coil 904 induces current in a loop circuit extending over trunk 900 which may be traced from the upper left winding of repeating coil 904, upper contacts of jack 921, conductor 906, switch contacts 614, upper right winding of repeating coil 613, condenser 641, front contact of relay 602, lower right winding of repeating coil 613, switch contacts 612, conductor 905, lower contacts of jack 921, lower left winding of repeating coil 904, lower back contact of relay 903, condenser 922, upper back contact of relay 903, to the upper left winding of repeating coil 904. Current flowing in this loop is again induced into the input transformer 715 of repeater 700 over a circuit extending from the upper left winding of repeating coil 613, over conductor 716, left windings of transformer 715, conductor 717 to the left windings of repeating coil 613. The current impressed upon the left windings of transformer 715 is now amplified by the tubes 702 and 701 of repeater 700 and impressed upon the left windings of output transformer 718 which in turn impresses it over the right windings of transformer 718, conductor 719, switch contacts 642, trunk conductor 643, upper contacts of key 512, right windings of repeating coil 504, middle contacts of key 512, trunk conductor 644, switch contacts 645, conductor 720 to the right windings of output transformer 718.

Current is again impressed by repeating coil 504 upon a loop circuit extending from the upper left terminal of repeating coil 504, upper contacts of jack 521, trunk conductor 506, switch contacts 210, upper right winding of repeating coil 209, condenser 251, upper contact of relay 203, lower right winding of repeating coil 209, switch contacts 208, trunk conductor 505, lower contacts of jack 521, lower left winding of repeating coil 504, lower back contact of relay 503, condenser 522, upper back contact of relay 503, to the upper left winding of repeating coil 504. The current thus impressed on the right windings of repeating coil 209 is in turn impressed over the left windings of coil 209, conductor 316, left windings of input transformer 315 of repeater 300, conductor 317 to the left windings of repeating coil 209. Repeater 300 amplifies the current thus impressed on the transformer 315 and impresses it upon the left windings of output transformer 318 which in turn impresses it over a loop circuit extending from the right windings of transformer 318 over conductor 319, switch contacts 242, resistance 126, condenser 124, outer upper contact of relay 106, tip wipers of selectors 103 and 102 and line finder 101 through the calling subscriber's receiver thence over ring wipers of line finder 101 and selectors 102 and 103, inner upper front contact of relay 106, condenser 125, resistance 127, switch contacts 245, conductor 320 to the right windings of output transformer 318. Thus the calling subscriber on line 100 is enabled to hear the announcement made by the operator.

Figure 5:
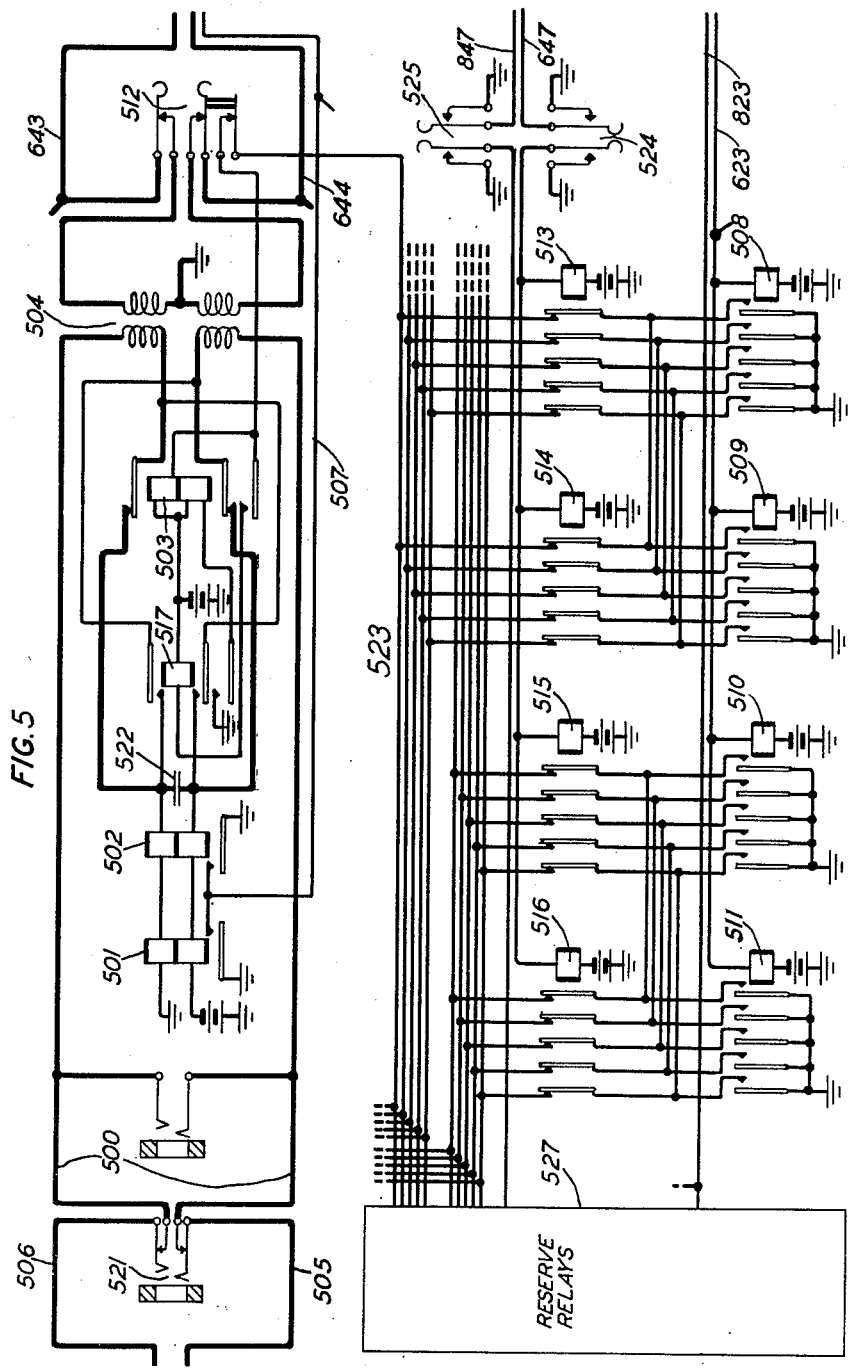

At the same time, other subscribers' lines which may at the same time be connected to the network also receive the announcement over branches of the circuits above traced extending from conductors 918 and 920 at the outgoing distributing point, Fig. 9; from conductors 643 and 644 at the intermediate distributing center, Fig. 5; and from conductors of trunk 200 at the local distributing center, Fig. 2.

Figure 14:
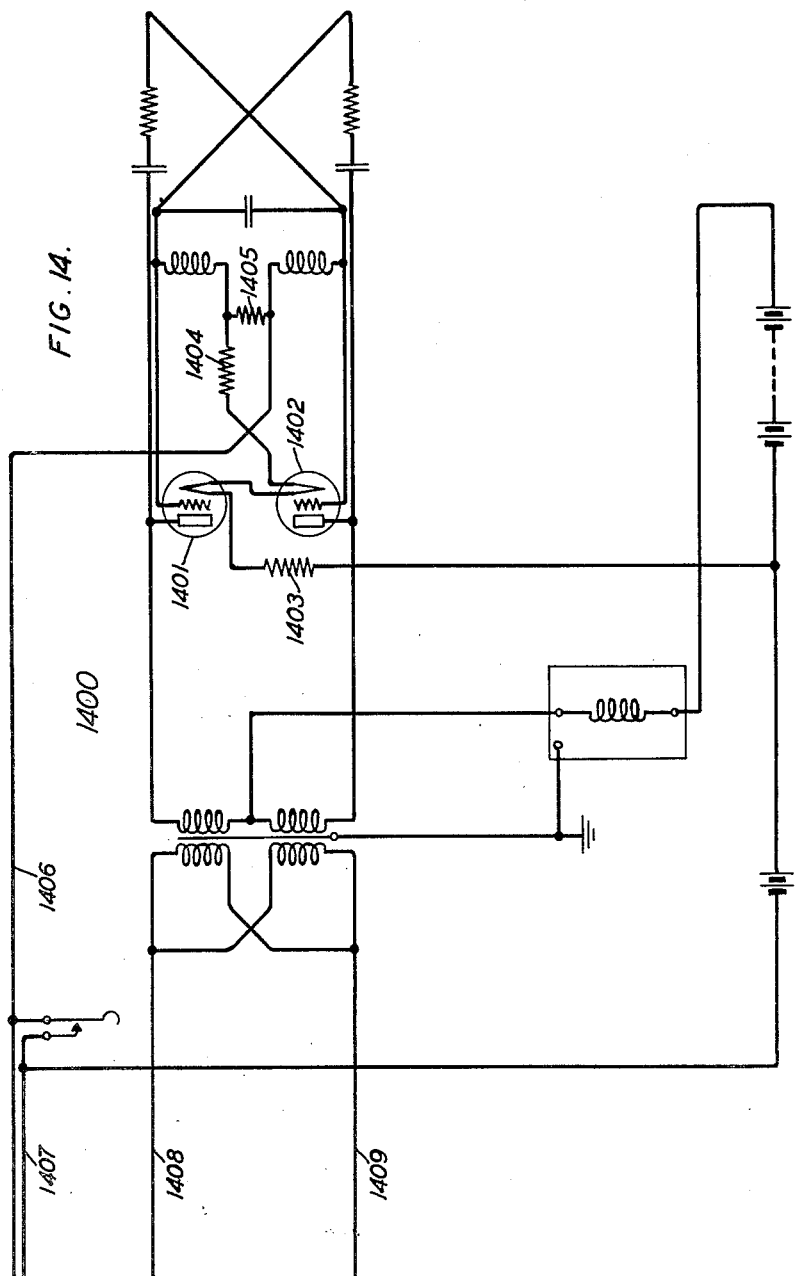

After the announcement has been made by the central bureau operator and relay 1032 has operated as previously described, a tone signal is applied over the network from the oscillator 1400 of Fig. 14 in the manner just described for the transmission of voice current.

Immediately following the completion of the announcement period, current flowing over the loop supervisory circuits of the trunk network is again reversed by the clock circuit so that relay 215 at the local distributing center again operates. With relay 106 now operated, a circuit is established from battery, winding and lower normal contact of relay 107, No. 5 contact of relay 106, conductor 119, to ground. Relay 107 operates and locks to ground at the inner upper front contact of relay 108 and opens its own operating circuit. The purpose of operating relay 107 at this time is to cancel the reverse battery through the windings of relay 105 in order to prevent the calling subscriber from being charged for more than one call. The calling subscriber may now listen to more than one time announcement if he so desires.

*Restoration of connection*

When the calling subscriber hangs his receiver upon the switchhook, relay 105 releases opening the operating circuit of relay 108. Relay 108 being slow to release, however, permits relay 109 to operate from ground at the back contact of relay 105 over the lower front contact of relay 108. Relay 108 releases after an interval, disconnecting ground from the sleeve terminal of selector 103, thereby releasing switches 103, 102 and 101, releases relays 106 and 107 and closes the release circuit of switch 150. This release circuit may be traced from battery through the winding of release magnet 131, lower alternate contacts of off-normal switch 120, lower back contact of relay 108 to ground at the back contact of relay 105. When switch 150 reaches normal position, the circuit of magnet 131 is opened and starting ground is removed from conductor 121. If there are no other calling subscribers' lines at the time connected to the local distributing center, start relay 203 thereat will release, thereby releasing relays 501 and 502 which in turn release opening start conductor 507. If there are no other calls at the time incoming to the intermediate distributing center, relay 605 thereat will release, in turn releasing relays 606 and 602. Relay 602 in turn releases relays 901 and 902 which remove starting ground from conductor 907, thereby releasing relays 1022, 1023 and 1019 at the desk circuit to remove starting ground from conductor 1026 and to extinguish the call waiting lamp 1024.

*Alternate distributing circuits*

In the previous description it has been pointed out that repeaters 300 and 700 at the local and intermediate distributing centers may, if defective, be removed from service by the operation of switches 250 and 650 and substitute repeaters 400 and 800 placed into service by the operation of switches 450 and 850. A further safeguard against circuit failure is also provided at the intermediate distributing center whereby a group 523 of supervisory distributing relays Fig. 5, may be cut out of service and a similar group of relays 527 substituted therefor. Reserve relays corresponding to relays 508 to 511 inclusive and 513 to 516 inclusive of group 523 are not disclosed in detail in Fig. 5 but have been indicated by the rectangle 527. If the maintenance man for example, should find it necessary to remove relays 508 to 511 inclusive from service he will operate key 524, thus operating relays 513 to 516 inclusive, thereby rendering relays 508 to 511 ineffective to control reversing relays such as 503 of trunk 500 outgoing from the intermediate distributing center to local distributing centers. With key 524 operated, a circuit is established from ground over the right contacts of this key, conductor 647, contacts 646 of switch 650 to battery through the winding of relay 637. Relay 637 thereupon operates to close circuits for alarm signals on the board 621 to indicate that the switch 650 should be operated to the right and that switch 850 should be operated to the left to cut the repeater circuit 700 out of service and to cut the repeater circuit 800 into service.

Figure 6:
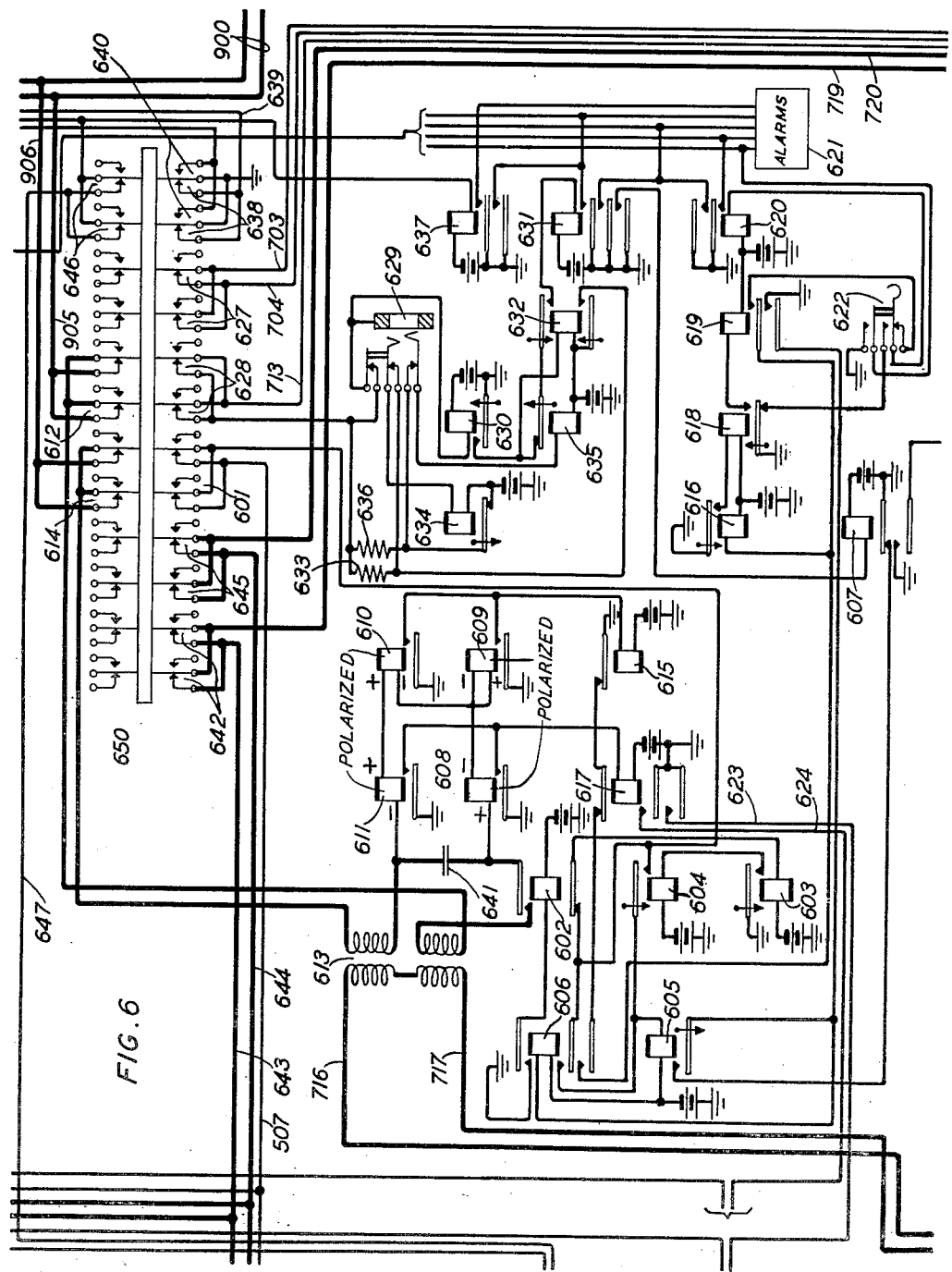

Similarly, if the circuits of Fig. 8 and the reserve group 527 of relays of Fig. 5 are in service and the reserve relays develop trouble and the maintenance man desires to remove them from service and place the circuits of Fig. 6 and the group of relays 523 shown in Fig. 5 into service, he should throw switch 650 to the left, throw switch 850 to the position shown in Fig. 8 and operate key 525, Fig. 5. Key 525 operates relays similar to relays 513 to 516 inclusive of group 527 to render the relays corresponding to 508 to 511 ineffective and at its right contacts connects ground to conductor 847. If switch 850 has not been restored to the left as it should be in this case, a circuit is extended from ground on conductor 847 over the left contacts 846 of switch 850, conductor 648 through the winding of relay 637 thus operating the alarm signals.

The supervisory relays such as 908 to 911 inclusive, of group 923 Fig. 9, if troubles develop therein, may be removed from service by the operation of key 924 which operate relays 913 to 916 inclusive to render these relays ineffective and a reserve group 927 of similar relays indicated by the rectangle 927 may then be substituted therefor. Key 924 when operated also establishes a circuit over conductor 926, the back contact of relay 1047 to battery through the winding of relay 1048. Relay 1048 operates and lights out-of-service lamp 1049 at the maintenance man's position and out-of-service lamp 1051 at the operator's position. Relay 1027 is also operated from ground on conductor 926 to open the reversing conductors 1028 and 1029, thus preventing any calls from being connected to the bureau while the operator is connected to the desk circuit 1000 of Fig. 10.

Figure 13:
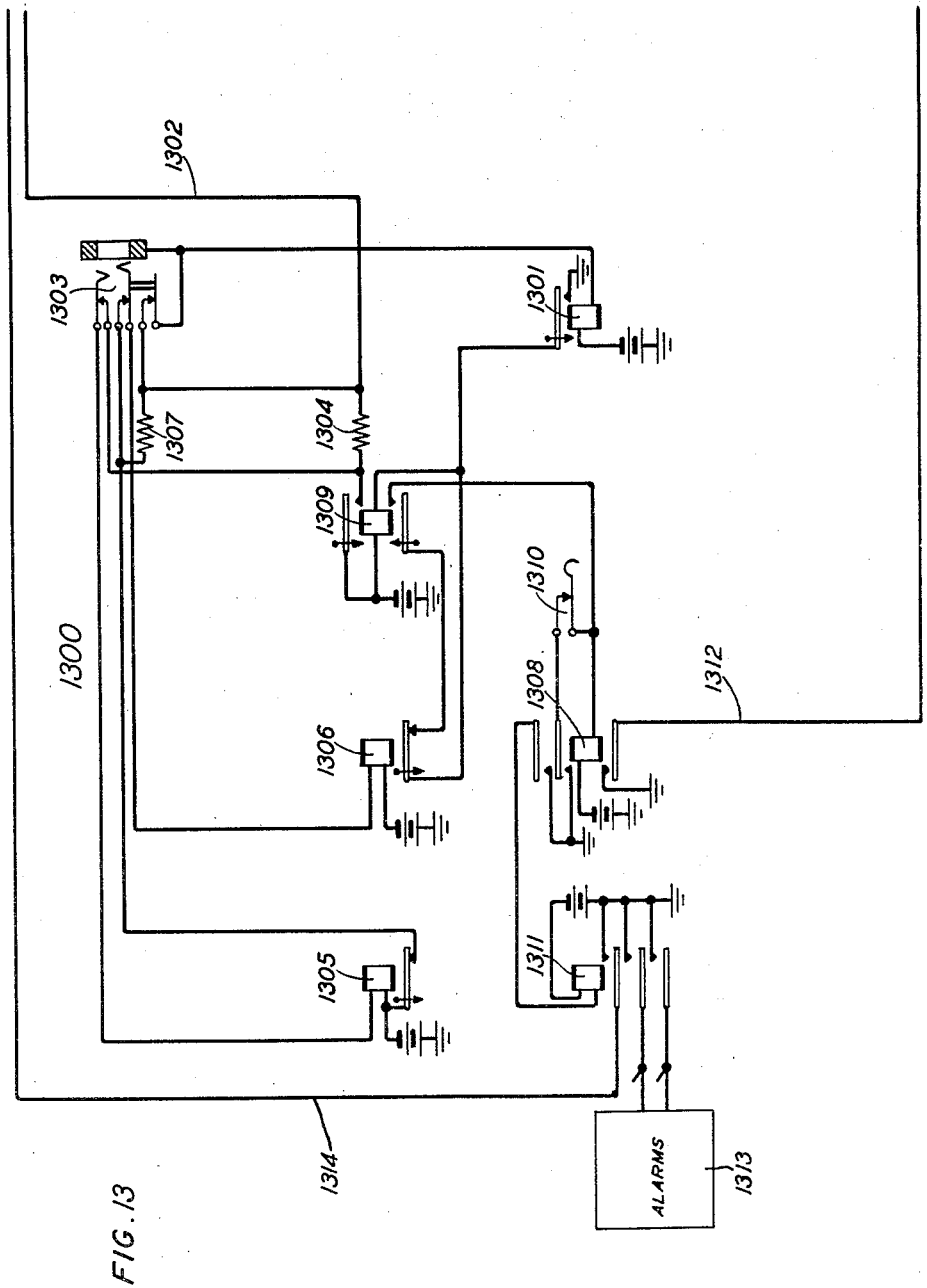
Figure 15:
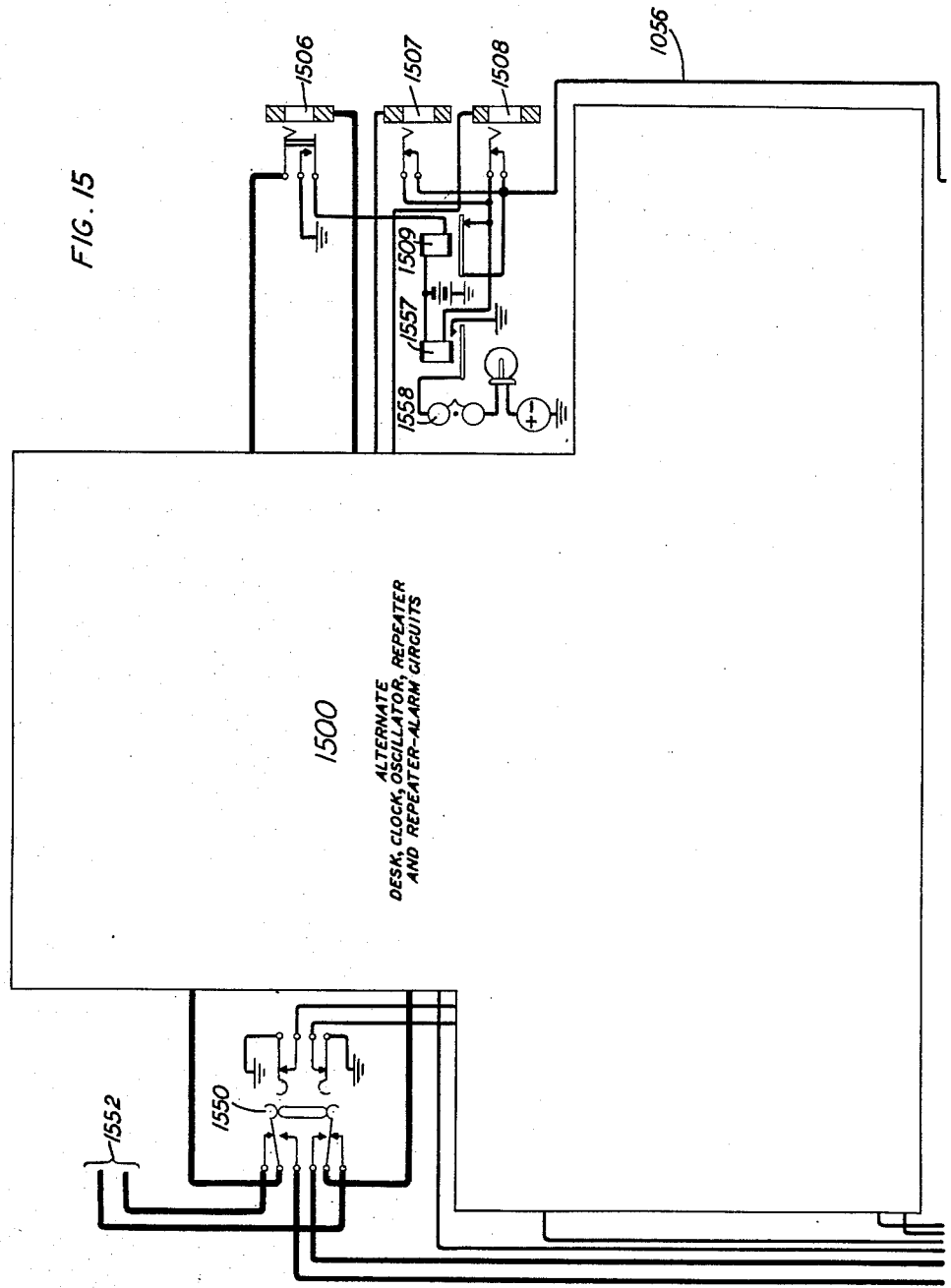

The operator upon noting the lighted lamp 1051 withdraws plugs 1003, 1004 and 1005 from the jacks 1006, 1007 and 1008 and connects these plugs with jacks 1506, 1507 and 1508 of the emergency desk circuit shown diagrammatically by the rectangle 1500 of Fig. 15. This causes relays 1009 and 1010 of the vacated desk circuit to release, relay 1010 causing relay 1012 to release to open the filament circuit of the associated repeater 1200 and to release relay 1013. Relay 1013 upon releasing, releases relay 1014, opens the alarm conductor extending from the back contact of relay 1212 of repeater 1200 to the alarm circuit 1300 of Fig. 13 and causes relays 1022, 1023 and 1019 to release in turn. The release of relay 1014 opens the circuits of relays 1017 and 1015 which also release. The release of relay 1015 opens the filament circuits of the volume indicator 1018 and of the oscillator 1400. With the release of relay 1023, the calling lamp 1024 is extinguished and starting ground is removed from conductor 1026 extending to the clock circuit of Fig. 11. When the operator plugs into the jacks 1506, 1507 and 1508 of the alternate desk circuit 1500 this desk circuit including an associated clock circuit, repeater circuit, oscillator and volume indicator, and repeater alarm circuit, functions as previously described in connection with Figs. 10 to 14 inclusive.

The maintenance man upon observing the out-of-service lamp 1049 lighted, operates key 1050 to the left, thus disconnecting the talking conductors of the desk circuit 1000 from the trunk conductors 918 and 920. With key 1050 thrown to the left, obvious circuits are closed for relay 1047 and relay 1053 causing these relays to operate. Relay 1047 opens the circuit of relay 1048, thereby extinguishing lamps 1049 and 1051. The maintenance man then operates key 1550 to the right, connecting the trunk conductors 918 and 920 to the desk circuit 1500. Incoming calls are now directed to the desk circuit 1500 in the same manner as previously described in connection with desk circuit 1000. In a similar manner, if desk circuit 1500 is in service with the distributing relay set 927 and trouble arises in the relay set, the key 925 would be operated, performing functions similar to key 924.

*Alternate desk and associated circuits*

In the event that trouble should be encountered in the repeater 1200 associated with desk circuit 1000 and it fails to emit space current when connected into service and relay 1212 does not operate, a circuit is established from ground at the back contact of relay 1212, conductor 1218, lower contact of relay 1013, conductor 1302, lower contact of jack 1303 to battery through the winding of slow operating relay 1301 and in parallel through resistance 1304, upper contacts of jack 1303 to battery through the winding of slow releasing relay 1305. Relay 1305 operates before relay 1301 and at its back contact opens a shunt extending over the middle contacts of jack 1303 around the winding of slow releasing relay 1306. Relay 1306 now operates in a circuit from battery through its winding, middle contacts of jack 1303, resistance 1307 to ground on conductor 1302. Relay 1306 opens the operating path of relay 1308. Relay 1301 now operates and in turn operates slow to operate relay 1309 which at its upper contact closes a shunt extending over the upper contacts of jack 1303, around the winding of relay 1305 and at its lower contact prepares the circuit of relay 1308. Relay 1305 upon being shunted releases after an interval, shunting relay 1306 which after an interval releases and closes the circuit of relay 1308 from battery, winding of relay 1308, lower front contact of relay 1309, back contact of relay 1306 to ground at the front contact of relay 1301. Relay 1308 upon operating locks over the contact of key 1310 and its own front contact, closes an obvious circuit for relay 1311 and closes a circuit from ground at its lower contact over conductor 1312 through the trouble lamp 1219 on the repeater panel. Relay 1311 upon operating closes suitable alarm circuits to the alarm board 1313 and at its upper front contact connects ground over conductor 1314 for operating relays 1027 and 1048 at the associated desk circuit. It is to be noted that the provision of the slow to operate and slow releasing relays 1301, 1305, 1306 and 1309 introduces a suitable delay following the connection of ground to conductor 1302 after the desk circuit 1000 is taken into service, to permit the tubes of repeater 1200 to become heated and that the alarm circuits are not closed unless the tubes fail to function properly within a predetermined interval.

At the desk circuit 1000 upon the operation of relay 1027, the supervisory reversing conductors 1028 and 1029 are opened to prevent any subscribers' lines from being cut through to the central bureau, and upon the operation of relay 1048, the out-of-service lamp 1051 is lighted at the operator's position to inform her that she should transfer to the desk circuit 1500 and out-of-service lamp 1049 is lighted at the maintenance man's position. The maintenance man upon observing the lighted lamp 1049 operates key 1050 to the left thus disconnecting the talking conductors of desk circuit 1000 from the trunk conductors 918 and 920 and connecting this desk circuit with his test line 1052 and operates key 1550 to the left to connect the trunk line with the desk circuit 1500.

With key 1050 thrown to the left, obvious circuits are closed for relays 1047 and 1053, causing these relays to operate. Relay 1047 opens the circuit of relay 1048, thereby extinguishing lamps 1049 and 1051 and closes an obvious circuit for relay 1054 which in turn closes an obvious circuit for relay 1016. Relay 1016 locks over the upper contact of relay 1054 to ground at the lower right contact of key 1050. Relay 1016 upon operating opens the circuit of relay 1017 at one point, this circuit being further opened at the contact of relay 1014 as soon as the operator disconnects from the desk circuit 1000. Relay 1017, however, reoperates over an obvious circuit closed by relay 1053, thus connecting the talking conductors of the desk circuit over its front contacts and the left contacts of key 1050 to the test line 1052 for testing purposes. Relay 1053 also closes a circuit extending from ground at its lower front contact over the upper front contact of relay 1047 to battery through the winding of relay 1048 for reoperating relay 1048 to relight lamps 1049 and 1051, these lamps now remaining lighted until the key 1050 is restored.

The maintenance man may now test the vacated channel under operating conditions by having a spare transmitter plugged into jack 1006 and a receiver connected to the test line 1052. With the spare transmitter plugged up, relays 1009, 1010, 1012, 1013, 1014, 1015, 1020, 1021, 1022, 1023, 1019 and 1032 function as previously described, and the maintenance man will be able to hear regular announcements made by the operator through the spare transmitter and also receive tones from the oscillator 1400.

After the maintenance man has repaired the trouble he will restore the key 1050 to normal and operate key 1310 in the repeater alarm circuit. The operation of key 1310 releases relay 1308 which in turn releases relay 1311, opening the alarm circuits. When key 1050 is restored, relay 1053 releases, but relay 1047 is held operated over a circuit extending over the upper contacts of relay 1054 to ground at the upper contact of relay 1014. Relay 1047 holds relays 1054 and 1027 operated. When relay 1053 releases, relay 1017 releases, since at this time relay 1016 is operated, and at its lower back contact connects interrupted ground from interrupter 1055 over the upper front contact of relay 1047 through the winding of relay 1048. Relay 1048 is now intermittently operated to flash out-of-service lamps 1049 and 1051. The operator noting the flashing of lamp 1051 will disconnect the spare transmitter from jack 1003, thus releasing relays 1009 and 1010, which in turn cause the release of relays 1012, 1013, 1014, 1015, 1022, 1023 and 1019. Relay 1014 upon releasing releases relay 1047 which in turn releases relay 1048, and extinguishes lamps 1049 and 1051 and releases relays 1054 and 1016. The extinguishing of lamp 1051 is a signal to the operator that the associated channel is operative. The desk circuit of Fig. 15 may in a similar manner be removed from service and connected to test line 1552 for testing purposes.

Desk circuit alarm

Should the desk circuits be both vacated and a call be incoming, ground on conductor 907 is extended over the normal contacts of jacks 1007 and 1008, conductor 1056, normal contacts of jacks 1507 and 1508 to the winding of relay 1557. Relay 1557 operates, closing a circuit for audible signal 1558. Should the transmitter plug 1003 be inserted in jack 1006 of desk circuit 1000 and the receiver plugs 1004 and 1005 be inserted in jacks 1507 and 1508 of desk circuit 1500 or vice versa and a call be incoming, ground on conductor 907 is extended over normal contacts of jacks 1007 and 1008, and conductor 1056, back contact of relay 1509 to battery through the winding of relay 1557, thus operating the audible signal 1558. It is to be noted that if the transmitter plug 1003 and receiver plugs 1004 and 1005 are inserted into the jacks of the same desk circuit, that no circuit is possible for relay 1557.

Transmission circuit padding

In the previous description, reference was made to the padding resistances 1042, 1046, and 1057 in the operator's transmission circuit. Padding resistances are provided for the purpose of controlling the volume of transmission from the operator's transmitter 1001 in accordance with the strength of operators' voices. When an operator who has a voice of average strength is making the announcement, the volume control key 1061 is in the normal position and the volume padding resistances 1042, 1046 and 1057 are effective as previously described. If, however, an operator has a weak voice, the key 1061 is operated to the left thus operating relays 1040 and 1044 to remove the padding resistances altogether. If the operator has a voice strength greater than the average, key 1061 is operated to the right, thus operating relays 1041 and 1043 to substitute padding resistances 1058, 1059 and 1060 for resistances 1042, 1046 and 1057. The reading of the volume indicator galvanometer 1062 is used in determining the proper position of the volume control key 1061 for different operators who may announce the time of day.

What is claimed is:

1. In a telephone exchange system, a central bureau, an outgoing distributing point associated therewith, a plurality of intermediate distributing centers, a plurality of local distributing centers, a plurality of offices, local trunks extending from each office to the local distributing center nearest thereto, a trunk circuit extending from each local distributing center to an intermediate distributing center and multipled at the local distributing center to all local trunks incoming thereto, and a trunk circuit extending from each intermediate distributing center to said outgoing distributing point and multipled at the intermediate distributing center to all trunks incoming thereto from local distributing centers.

2. In a telephone exchange system, a central bureau, an outgoing distributing point associated therewith, a plurality of local distributing centers, a plurality of offices, local trunks extending from each office to the local distributing center nearest thereto, and a trunk circuit extending from each local distributing center to said outgoing distributing point and multipled at the local distributing center to all local trunks incoming thereto.

3. In a telephone exchange system, a central bureau, a plurality of intermediate distributing centers, a plurality of offices, a plurality of local distributing centers each having a plurality of trunks outgoing therefrom to said offices, and a trunk line outgoing from said central bureau and fanned out from said central bureau through said intermediate and local distributing centers into multiple connection with the trunks outgoing to said plurality of offices.

4. In a telephone exchange system, a central bureau, an outgoing distributing point associated therewith, a plurality of offices, a plurality of local distributing centers each having a plurality of trunks outgoing therefrom to said offices, and a trunk line outgoing from said central bureau to said outgoing distributing point, and fanned out from said outgoing distributing point through said local distributing centers into multiple connection with the trunks outgoing to said plurality of offices.

5. In a telephone exchange system, a central bureau having a telephone transmitter, a plurality of intermediate distributing centers, a plurality of local distributing centers, a plurality of offices each having a plurality of trunks outgoing therefrom to the nearest local distributing center and a plurality of telephone lines terminating therein, means in each office for establishing connections from the lines terminating therein to the trunks outgoing therefrom, and a trunk line outgoing from said central bureau and fanned out from said central bureau through said intermediate and local distributing centers into a multiple connection with the trunks outgoing from said plurality of offices for concurrently connecting said transmitter with a plurality of said telephone lines.

6. In a telephone exchange system, a central bureau having a telephone transmitter, a plurality of local distributing centers, a plurality of offices, each having a plurality of trunks outgoing therefrom to the nearest local distributing center and a plurality of telephone lines terminating therein, means in each office for establishing connections from the lines terminating therein to the trunks outgoing therefrom, and a trunk line outgoing from said central bureau and fanned out from said central bureau through said local distributing centers into a multiple connection with the trunks outgoing from said plurality of offices for concurrently connecting said transmitter with a plurality of said telephone lines.

7. In a telephone system, a central bureau having a telephone transmitter, repeater, and an outgoing distributing point, a plurality of intermediate distributing centers, trunk lines each including a repeater multipled together at said outgoing distributing point and extending through said intermediate distributing centers, a plurality of local distributing centers, trunk lines each including a repeater multipled together at said intermediate distributing centers and extending to said local distributing centers, local office trunks terminating in each of said local distributing centers and multipled to the trunk line incoming thereto from an intermediate distributing center, telephone lines terminating in each local office, and means at each office for concurrently connecting telephone lines terminating therein with the local office trunks thereof and thence through said local and intermediate distributing centers and said outgoing distributing point to the transmitter at said central bureau.

8. In a telephone system, a central bureau having a telephone transmitter, repeater and an outgoing distributing point, a plurality of local distributing centers, trunk lines each including a repeater multipled together at said outgoing distributing point and extending to said local distributing centers, local office trunks terminating in each of said local distributing centers and multipled to the trunk line incoming thereto from said outgoing distributing point, telephone lines terminating in each local office, and means in each office for concurrently connecting telephone lines terminating therein with the local office trunks thereof and thence through said local distributing centers and through said outgoing distributing point to the transmitter at said central bureau.

9. In a telephone system, a central bureau having a telephone transmitter and a clock circuit, a plurality of local distributing centers, a plurality of offices each having a plurality of trunks outgoing therefrom and a plurality of telephone lines terminating therein, means in each office for establishing connections from the lines terminating therein to the trunks outgoing therefrom, a trunk line outgoing from said central bureau and fanned out through said local distributing centers into multiple connection with the trunks outgoing from said plurality of offices for concurrently connecting said transmitter with a plurality of said trunks, and means controlled by said clock circuit for cutting through the connections at the trunks outgoing from said offices.

10. In a telephone system, a central bureau having a telephone transmitter and a clock circuit, a plurality of intermediate distributing centers, a plurality of local distributing centers, a plurality of offices each having a plurality of trunks outgoing therefrom and a plurality of telephone lines terminating therein, means in each office for establishing connections from the lines terminating therein to the trunks outgoing therefrom, a trunk line outgoing from said central bureau and fanned out through said intermediate and local distributing centers into multiple connection with the trunks outgoing from said plurality of offices for concurrently connecting said transmitter with a plurality of said trunks, and means controlled by said clock circuit over said fanned out connection for cutting said outgoing trunks at offices into a connection with said transmitter.

11. In a telephone system, a central bureau having a telephone transmitter, alternative repeaters and an outgoing distributing point, a plurality of intermediate distributing centers, trunk lines each provided with alternative repeaters, said trunk lines being multipled together at said outgoing distributing point and extending to said intermediate distributing centers, a plurality of local distributing centers, trunk lines each provided with alternative repeaters, said trunk lines being multipled together at said intermediate distributing centers and extending to said local distributing centers, local office trunks terminating in each of said local distributing centers and multipled to the trunk line incoming thereto from an intermediate distributing center, telephone lines terminating in each local office, means at each office for concurrently connecting telephone lines terminating therein with the local office trunks and thence through the local and intermediate distributing centers and said outgoing distributing point to the transmitter at the central bureau, and means for rendering any one of said alternative repeaters effective.

12. In a telephone system, a central bureau having a telephone transmitter, a one-way repeater and an outgoing distributing point, a plurality of local distributing centers, trunk lines each including a one-way repeater, said trunk lines being multipled together at said outgoing distributing point and extending to said local distributing centers, local office trunks terminating in each of said local distributing centers and each provided with a barrier in the talking path for the elimination of cross-talk, said local office trunks being multipled to the trunk lines incoming from said outgoing distributing point, telephone lines terminating in each local office, and means in each office for concurrently connecting telephone lines terminating therein with the local office trunks thereof and thence through said local distributing centers and said outgoing distributing point in a one-way talking circuit with the transmitter of said central bureau.

13. In a telephone system, a central bureau having a telephone transmitter, a one-way repeater and an outgoing distributing point, a plurality of intermediate distributing centers, trunk lines each including a one-way repeater, said trunk lines being multipled together at said outgoing distributing point and extending to said intermediate distributing centers, a plurality of local distributing centers, trunk lines each including a one-way repeater, said trunk lines being multipled together at said intermediate distributing centers and extending to said local distributing centers, local office trunks terminating in each of said local distributing centers and each provided with a barrier in the talking path for the elimination of cross-talk, said local office trunks being multipled to the trunk line incoming to the corresponding local distributing center, telephone lines terminating in each local office, and means in each office for concurrently connecting telephone lines terminating therein with the local office trunks thereof and thence through said local and intermediate distributing centers and said outgoing distributing point in a one-way talking circuit with the transmitter of said central bureau.

14. In a telephone system, a central bureau having a telephone transmitter, a one-way repeater and an outgoing distributing point, a plurality of local distributing centers, trunk lines each including a one-way repeater, said trunk lines being multipled together at said outgoing distributing point and extending to said local distributing centers, local office trunks terminating in each of said local distributing centers and each provided with a barrier in the talking path comprising condensers and resistances for the elimination of cross-talk, said local office trunks being multipled to the trunk line incoming from said outgoing distributing point, telephone lines terminating in each local office, and means in each office for concurrently connecting telephone lines terminating therein with the local office trunks thereof and thence through said local distributing centers and said outgoing distributing point in a one-way talking circuit with the transmitter of said central bureau.

15. In a telephone system, a central bureau having a telephone transmitter, a local office having trunk circuits outgoing therefrom, a calling line, means for connecting said calling line with an idle outgoing trunk circuit, a trunk network for extending said trunk circuit to the central bureau, a supervisory circuit extending over said trunk network comprising a line relay and source of current at the central bureau end of said network and a supervisory relay at the office end of said network, means in said trunk circuit for closing said supervisory circuit upon the seizure of said trunk circuit to thereby operate said line relay, a start circuit at said bureau controlled by said line relay, means at said central bureau for reversing the current in said supervisory circuit to thereby operate said supervisory relay, a cut-through relay in said trunk circuit for connecting said transmitter over said network with said calling line, and means controlled by said supervisory relay for operating said cut-through relay.

16. In a telephone system, a central bureau having a telephone transmitter, a local office having trunk circuits outgoing therefrom, calling lines in said office, means in said office for connecting calling lines to idle outgoing trunk circuits, a trunk network for extending said trunk circuits to the central bureau, a supervisory circuit extending over said trunk network comprising a line relay and source of current at the central bureau end of said network and a supervisory relay at the office end of said network, means in said trunk circuits for closing said supervisory circuit upon the seizure of any of said trunk circuits to thereby operate said line relay, a start circuit at said bureau controlled by said line relay, means at said central bureau for reversing the current in said supervisory circuit to thereby operate said supervisory relay, a cut-through relay in each of said trunk circuits for connecting said transmitter over said network with the calling line connected to each trunk circuit, and means controlled by said supervisory relay for concurrently operating said cut-through relays.

17. In a telephone system, a central bureau having a telephone transmitter, local offices having trunk circuits outgoing therefrom, calling lines in said offices, means in said offices for connecting calling lines to idle outgoing trunk circuits, a trunk network extending to said central bureau to which said trunk circuits are multipled, a supervisory circuit extending over said trunk network comprising a line relay and source of current at the central bureau end of said network and a supervisory relay at the office end of said network, means in said trunk circuits for closing said supervisory circuit upon the seizure of any of said trunk circuits to thereby operate said line relay, a start circuit at said bureau controlled by said line relay, means at said bureau for reversing the current in said supervisory circuit to thereby operate said supervisory relay, a cut-through relay in each of said trunk circuits for connecting said transmitter over said network with the calling line connected with each trunk circuit, and means controlled by said supervisory relay for concurrently operating said cut-through relays.

18. In a telephone system, a central bureau having a telephone transmitter, a local office having trunk circuits outgoing therefrom, a calling line, means for connecting said calling line with an idle outgoing trunk circuit, a trunk network for extending said trunk circuits to the central bureau, a supervisory circuit extending over said trunk network, means controlled by the seizure of a trunk circuit for establishing said supervisory circuit to establish a start circuit at said central bureau, a cut-through relay in said trunk circuit for connecting said transmitter with said calling line, means at said bureau for changing the condition of said supervisory circuit to operate said relay, an alarm, and means for operating said alarm if said trunk circuit does not become extended to said bureau over said trunk network within a predetermined period.

19. In a telephone system, a central bureau having a telephone transmitter, a local office having trunk circuits outgoing therefrom, a calling line, means for connecting said calling line with an idle outgoing trunk circuit, a trunk network for extending said trunk circuits to the central bureau, a supervisory circuit extending over said trunk network comprising a line relay and source of current at the central bureau end of said network and two supervisory relays at the office end of said network, means in said trunk circuit for closing said supervisory circuit upon the seizure of said trunk circuit to thereby operate said line relay and the first of said supervisory relays, a start circuit at said bureau controlled by said line relay, an alarm, means for operating said alarm if said supervisory circuit is not closed to operate said first supervisory relay within a predetermined period, means at said central bureau for reversing the current in said supervisory circuit for thereby operating said second supervisory relay, a cut-through relay in said trunk circuit for connecting said transmitter with said calling line, and means controlled by said second supervisory relay for operating said cut-through relay.

20. In a telephone system, a central bureau having a telephone transmitter, an intermediate distributing center, a local office having trunk circuits outgoing therefrom, a calling line, means for connecting said calling line with an idle outgoing trunk circuit, a first trunk for connecting said trunk circuit to said intermediate distributing center, a first supervisory circuit extending over said trunk comprising a line relay and source of current at the intermediate distributing center and a supervisory relay at said local office end of said trunk, a second trunk connecting said intermediate distributing center with said central bureau, a second supervisory circuit extending over said second trunk comprising a line relay and source of current at the central bureau end, and a supervisory relay at said intermediate distributing center, means in said outgoing trunk circuit for closing said first supervisory circuit upon seizure of said trunk circuit to thereby operate said line relay at said intermediate distributing center, said line relay in turn closing said second supervisory circuit to operate said line relay at said central bureau, a start circuit at said central bureau controlled by said second line relay, means at said central bureau for reversing the current in said second supervisory circuit for operating said supervisory relay at said intermediate distributing center, means controlled by said latter supervisory relay for reversing the current in said first supervisory circuit for operating the supervisory relay thereof, a cut-through relay in said trunk circuit for connecting said transmitter over said trunks with said calling line, and means controlled by the supervisory relay of said first supervisory circuit for operating said cut-through relay.

In witness whereof, I hereunto subscribe my name this 5th day of January, 1931.

ROBERT F. MASSONNEAU.